(12) United States Patent
Cullen

(10) Patent No.: US 8,176,701 B2
(45) Date of Patent: May 15, 2012

(54) INSULATIVE SIDING APPARATUS AND METHOD OF MAKING THE SAME

(76) Inventor: Leslie D. Cullen, Meridian, ID (US)

( * ) Notice: Subject to any disclaimer, the term of this patent is extended or adjusted under 35 U.S.C. 154(b) by 52 days.

(21) Appl. No.: 12/797,525

(22) Filed: Jun. 9, 2010

(65) Prior Publication Data

US 2010/0242398 A1   Sep. 30, 2010

Related U.S. Application Data

(63) Continuation-in-part of application No. 12/484,904, filed on Jun. 15, 2009, now abandoned, which is a continuation of application No. 11/747,094, filed on May 10, 2007, now abandoned.

(60) Provisional application No. 60/746,910, filed on May 10, 2006.

(51) Int. Cl.
*E04D 1/00*     (2006.01)
(52) U.S. Cl. ............. 52/519; 52/506.1; 52/510; 52/539; 52/547; 52/582.1; 52/589.1
(58) Field of Classification Search ............... 52/506.01, 52/509, 510, 512, 153, 551, 520, 539, 543, 52/547, 483.1, 489.1, 489.2, 169.5, 578, 52/581, 582.1, 589.1
See application file for complete search history.

(56) References Cited

U.S. PATENT DOCUMENTS

| | | | |
|---|---|---|---|
| 2,961,804 A * | 11/1960 | Beckman | 52/539 |
| 3,428,471 A | 2/1969 | Tuthill et al. | |
| 4,034,528 A | 7/1977 | Sanders et al. | |
| 4,100,710 A | 7/1978 | Kowallik | |
| 4,274,236 A | 6/1981 | Kessler | |
| 4,299,069 A * | 11/1981 | Neumann | 52/309.4 |
| 4,372,901 A | 2/1983 | Kim | |
| 4,586,304 A | 5/1986 | Flamand | |
| 4,589,241 A * | 5/1986 | Volpenhein | 52/315 |
| 4,730,953 A | 3/1988 | Tarko | |
| 5,425,210 A | 6/1995 | Zafir | |
| 5,673,529 A * | 10/1997 | Treister et al. | 52/511 |
| 5,678,369 A | 10/1997 | Ishikawa et al. | |
| 5,759,670 A | 6/1998 | Bussey, Jr. et al. | |
| 5,987,835 A | 11/1999 | Santarossa | |
| 6,096,416 A | 8/2000 | Altenberg | |
| 6,298,626 B2 | 10/2001 | Rudden | |
| 6,442,912 B1 | 9/2002 | Phillips et al. | |
| 6,860,082 B1 | 3/2005 | Yamamoto et al. | |
| 6,968,659 B2 | 11/2005 | Boyer | |
| 2001/0009085 A1 | 7/2001 | Boyer | |
| 2001/0013211 A1 | 8/2001 | Rudden | |
| 2002/0124508 A1 | 9/2002 | Dunn et al. | |
| 2006/0053740 A1 | 3/2006 | Wilson et al. | |
| 2006/0254171 A1 * | 11/2006 | Bostock | 52/392 |

* cited by examiner

*Primary Examiner* — Brian Glessner
*Assistant Examiner* — Brian D Mattei
(74) *Attorney, Agent, or Firm* — Robert L. Shaver; Dykas & Shaver, LLP

(57) ABSTRACT

A system of interlocking decorative panels having a stone decorative element.

6 Claims, 23 Drawing Sheets

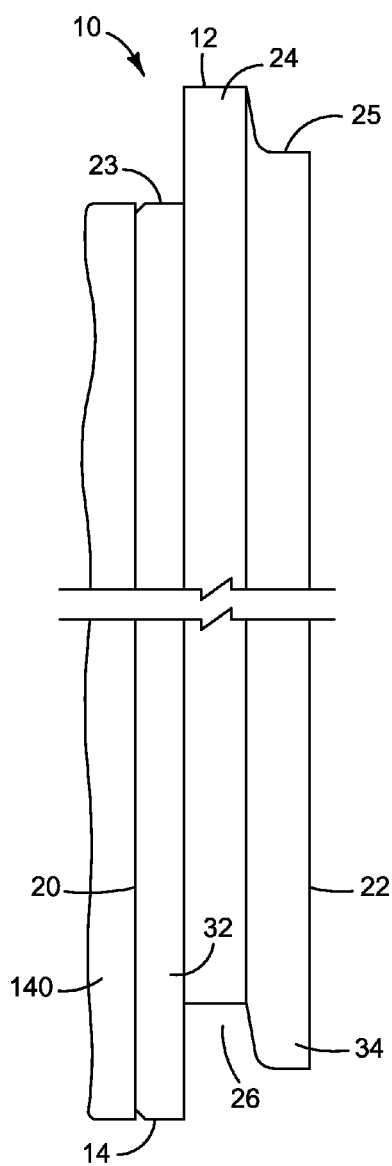
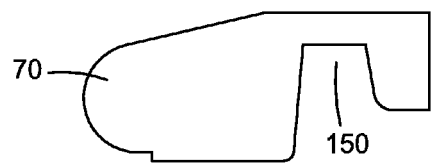
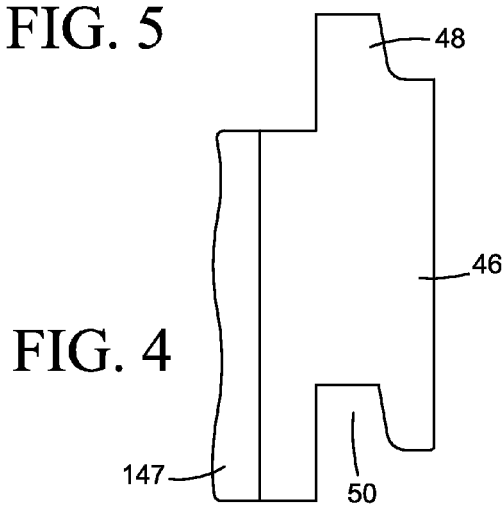
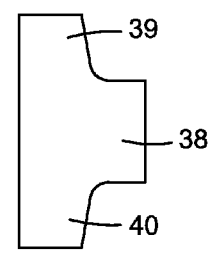
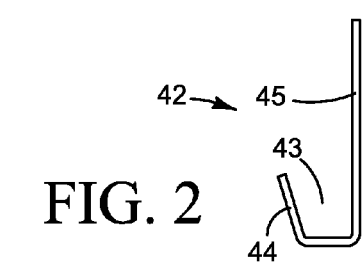
FIG. 1
FIG. 2
FIG. 3
FIG. 4
FIG. 5

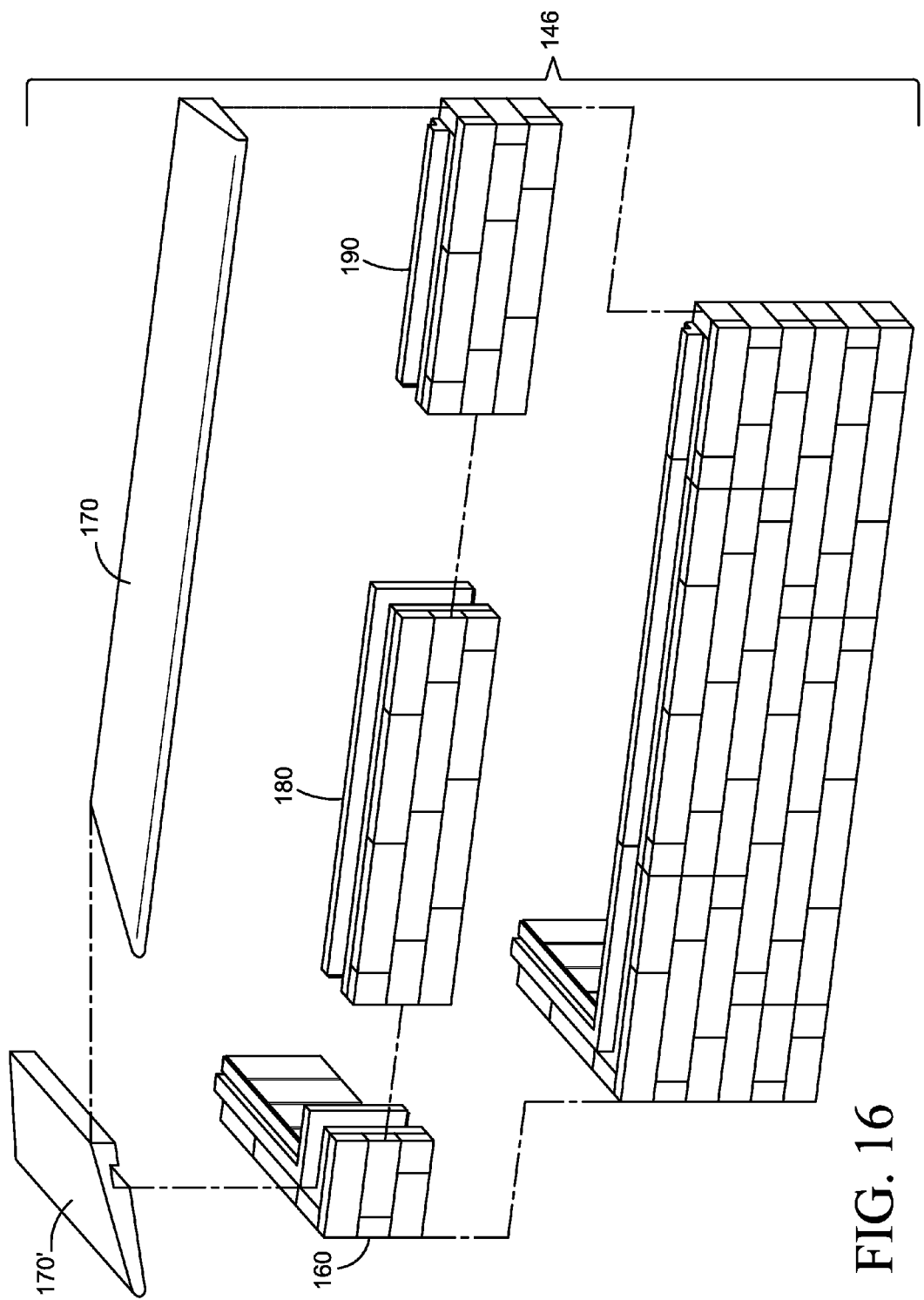

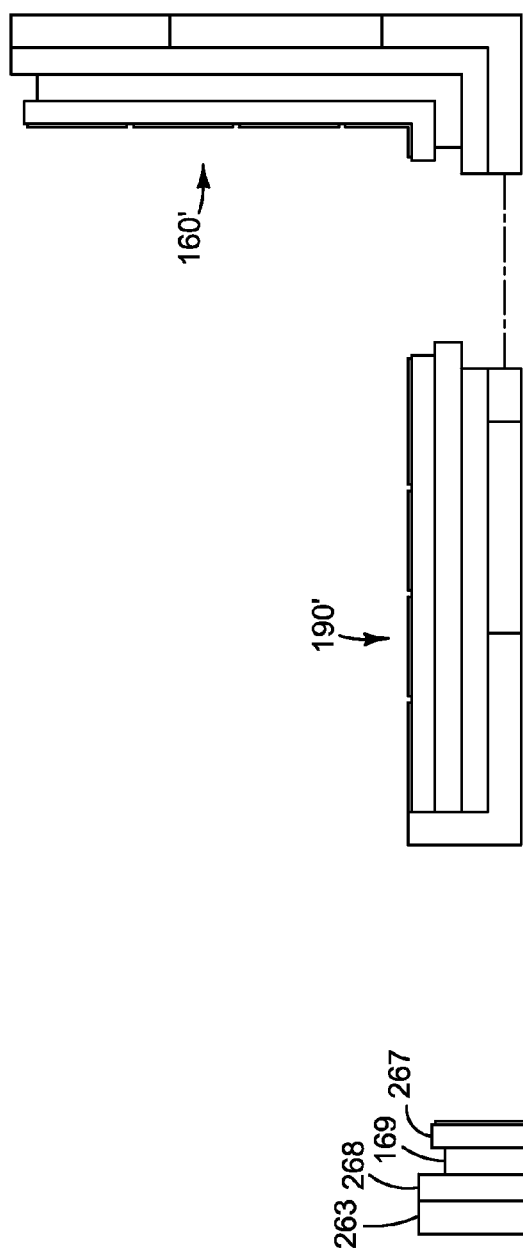
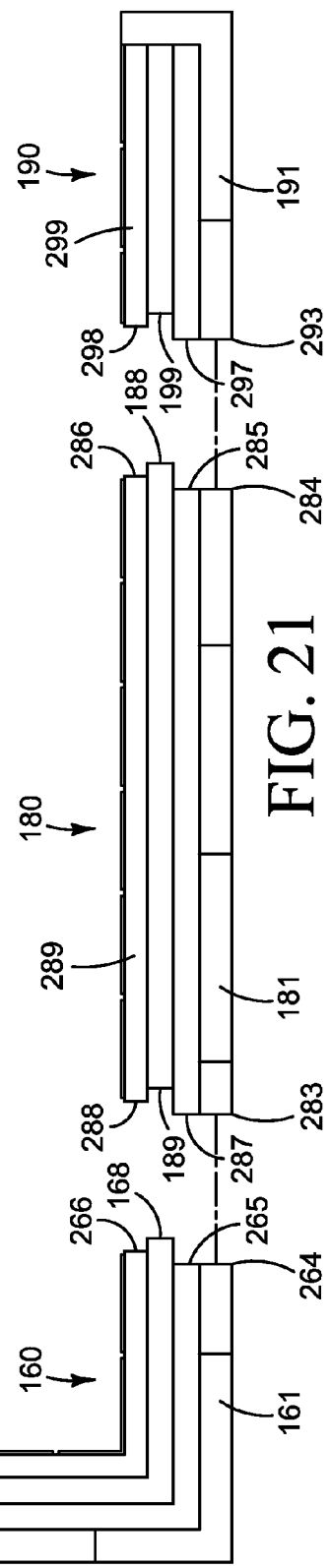
FIG. 20
FIG. 21

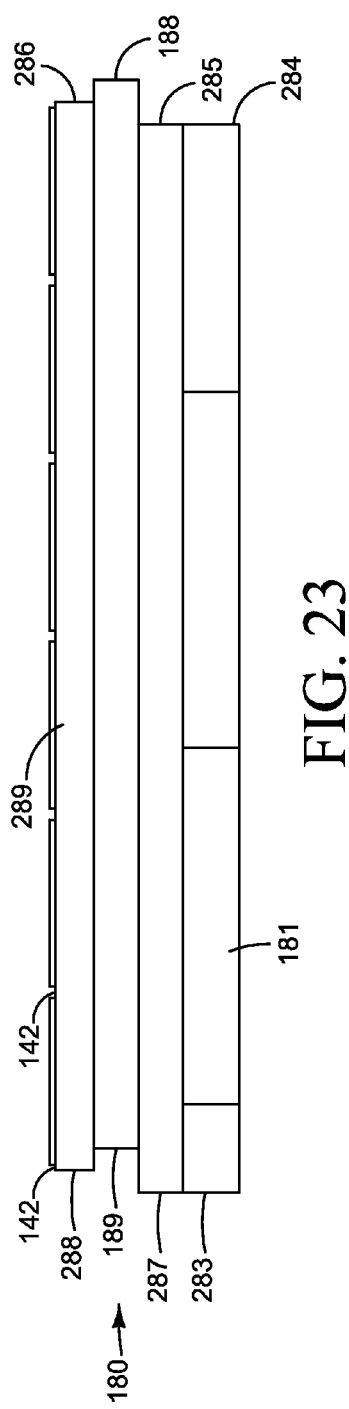
FIG. 23
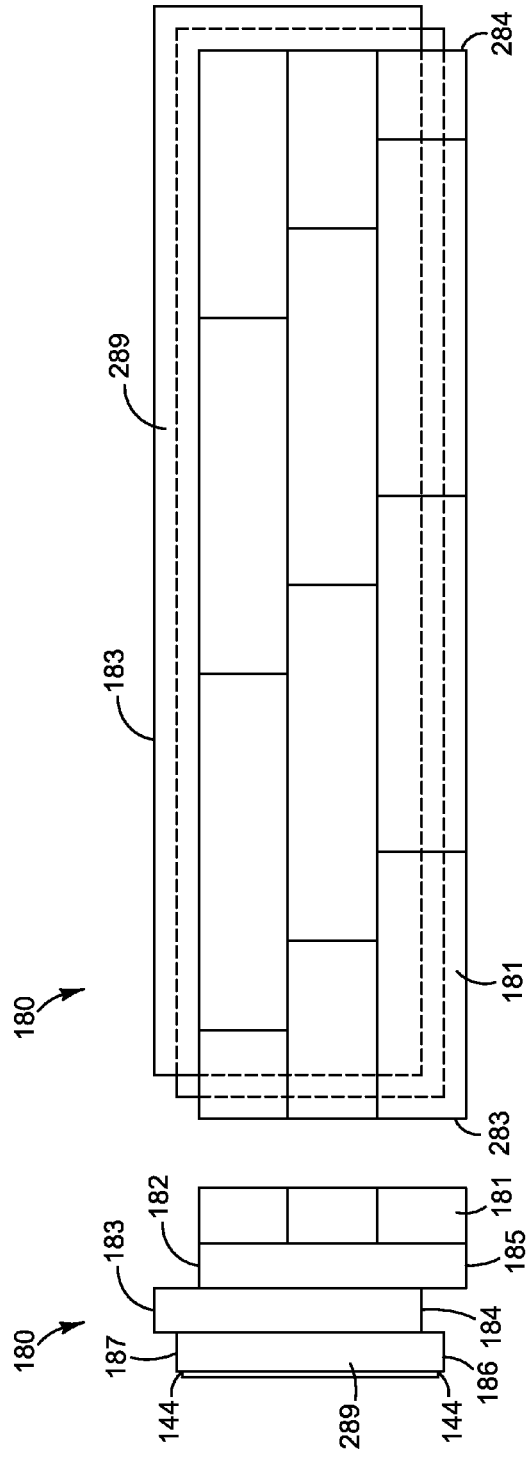
FIG. 22
FIG. 24

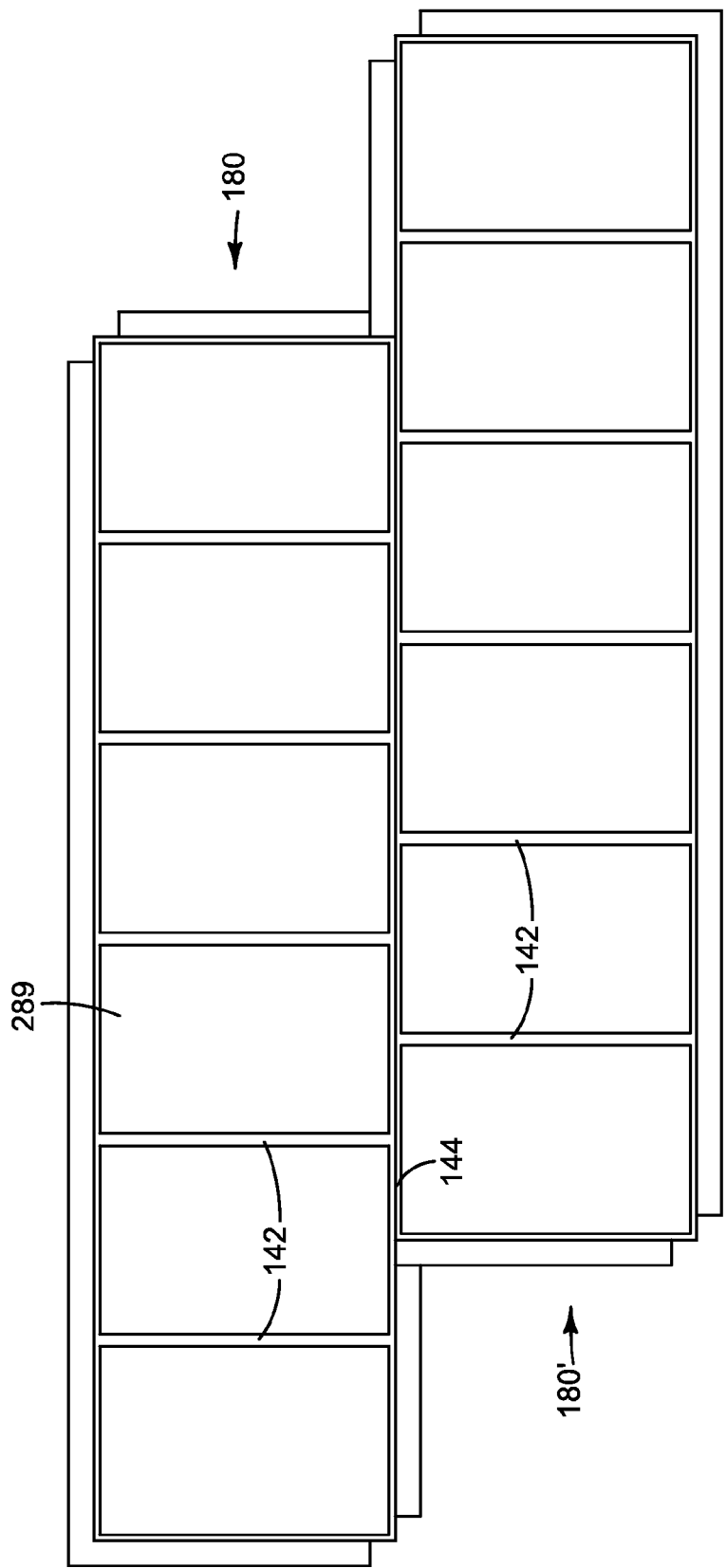

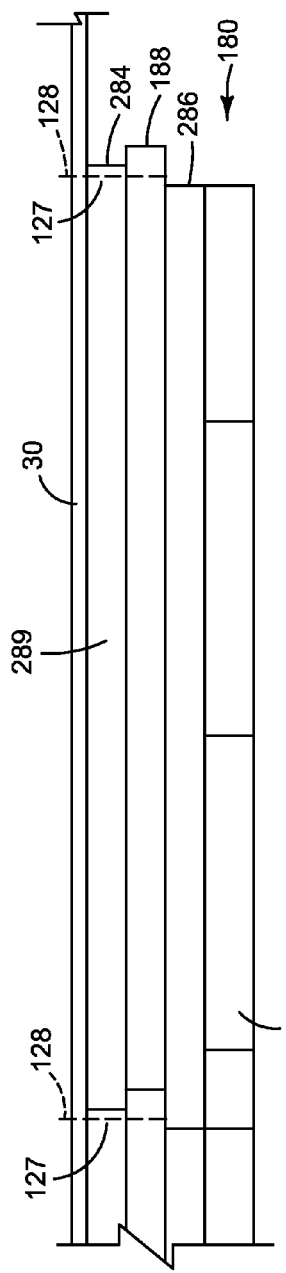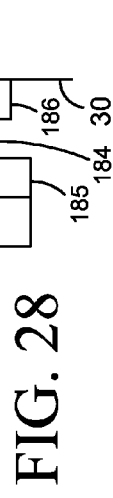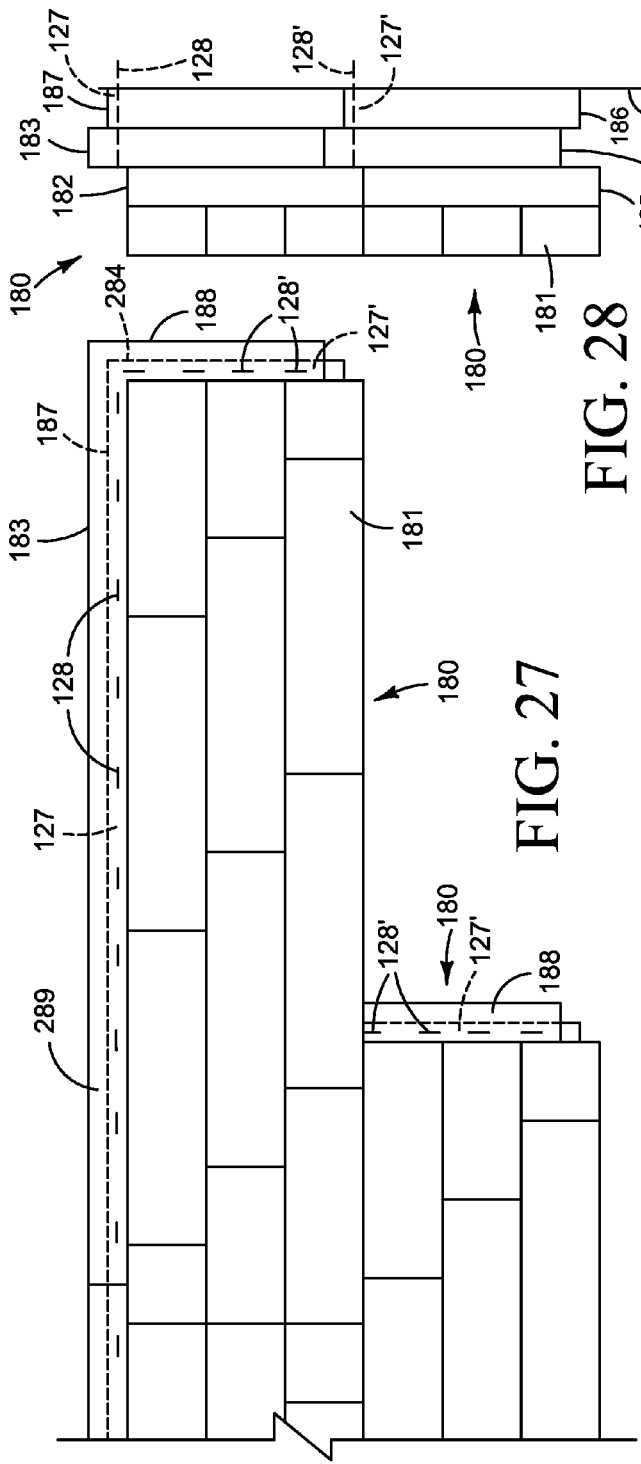

INSULATIVE SIDING APPARATUS AND METHOD OF MAKING THE SAME

PRIORITY/CROSS-REFERENCE TO RELATED APPLICATIONS

This application is a continuation-in-part application of application Ser. No. 12/484,904, filed Jun. 15, 2009, which was a continuation application of application Ser. No. 11/747,094, filed May 10, 2007, which was a non-provisional of application Ser. No. 60/746,910, filed on May 10, 2006, the disclosures of which are incorporated by reference.

TECHNICAL FIELD

The disclosure generally relates to the field of coverings for structures such as homes, commercial or industrial buildings. Particular inventive concepts relate to foam insulative panels for such structures.

SUMMARY OF THE DISCLOSURE

Disclosed is a system for covering the inside or outside surface of a structure, and the method of making said covering and its components.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the inventive concepts are to be regarded as illustrative in nature, and not as restrictive in nature.

BRIEF DESCRIPTION OF THE DRAWINGS

FIG. 1 is a partial, side view of a first panel.
FIG. 2 is a side view of a starter section.
FIG. 3 is a side view of an adapter.
FIG. 4 is a side view of a block out.
FIG. 5 is a side view of a drip cap piece.
FIG. 16 is an exploded view of the wall of FIG. 14.
FIG. 20 is a plan view of an end piece and a corner piece.
FIG. 21 is an exploded, plan view of the wall of FIG. 14.
FIG. 22 is a first side view of a flat piece.
FIG. 23 is a top view of the flat piece of FIG. 22.
FIG. 24 is an end view of the flat piece of FIG. 22.
FIG. 25 is a second side view of two flat pieces stacked together.
FIG. 26 is a partial, top side view of a number of flat pieces installed on a wall surface, showing fastener heads.
FIG. 27 is a partial, top side view of the flat pieces of FIG. 26.
FIG. 28 is an end view of the flat pieces of FIG. 26.

DETAILED DESCRIPTION OF THE PREFERRED EMBODIMENTS

Figure 6:
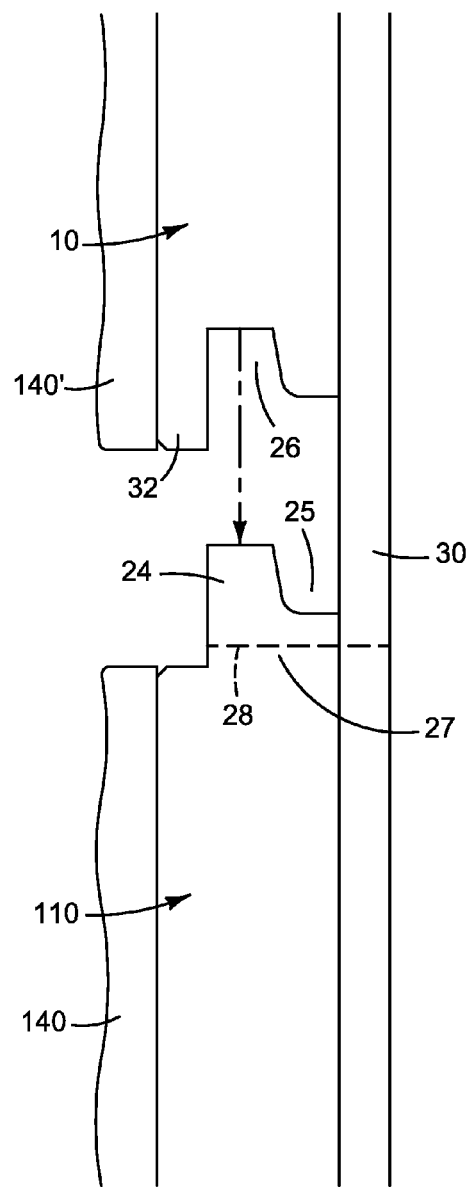
FIG. 6 is a partial, side view of two panels (of FIG. 1) about to be connected together, also showing the sheathing.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted. The use of "panel" refers to a structural building element, regardless of length, width, thickness or shape that forms a distinct section or component of a structure. The use of "adhesive" includes, but is not limited to, 100% silicone, low temperature urethane, waterproof sealant, caulk, paintable silicone, double sided adhesive tape, and tube adhesive. The use of "fastener" includes, but is not limited to, screws, bolts, staples, rivets, nails, metal fasteners, and plastic fasteners. The use of "foam" includes, but is not limited to, expanded polystyrene (EPS) foam, high density foam board, and polyurethane foam.

The figures show a number of embodiments of the inventive concept(s). One or more of these embodiments could be used in a wall panel system. One representative wall panel system would comprise the application of decorative siding panels (and associated structure) made from foam, preferably high-density expanded polystyrene (EPS) foam, to the outside wall surface of a structure. These siding panels configured for overlapping, having an interlocking tongue and groove structure, for purposes of sealing out moisture.

Figure 11:
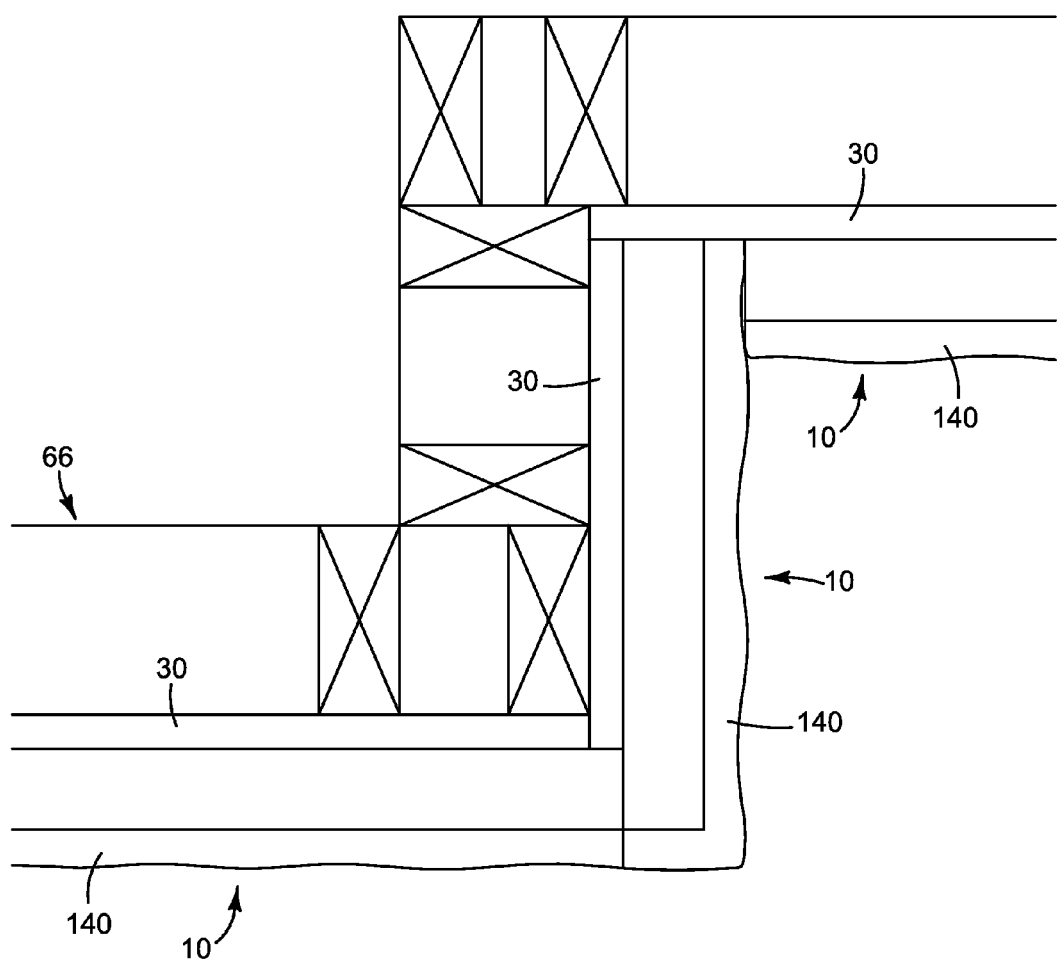
FIG. 11 is a plan view of one of the inventive concepts, installed on a stud wall, showing an outside corner connection.
Figure 12:
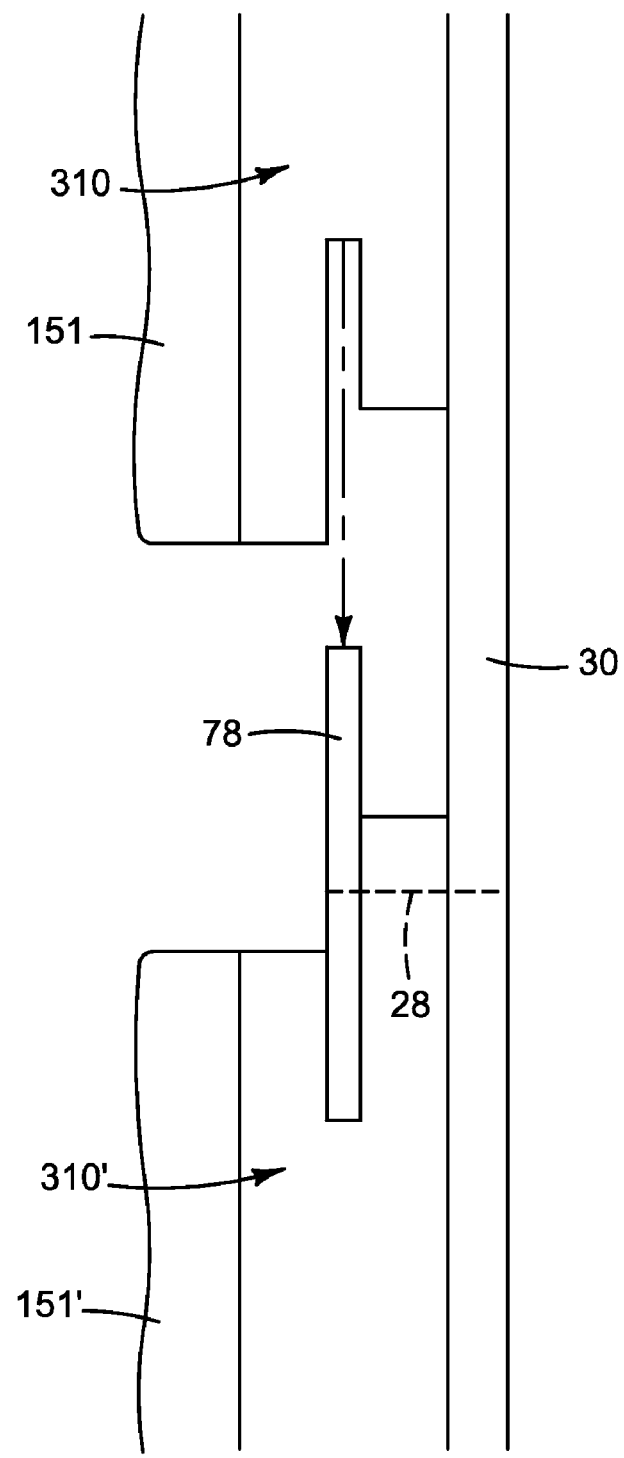
FIG. 12 is a partial, side view showing insulated siding installed on a stud wall.

Panels in the Figures include: 10 (FIG. 1), 110 (FIGS. 6-7), 210 (FIG. 10), 140 (FIG. 11), 310 (FIGS. 12), and 310' (FIG. 12).

Referring to FIG. 1, shown is one embodiment of a decorative siding panel 10. It is preferred that the panel have a body made from high density foam board, for instance expanded polystyrene (EPS), polyurethane, etc. It is preferred that the foam used have a density of 3-lb or greater, for instance 3.3-lb dense. Softer foams (such as, 1-lb, 2-lb, etc.) can likewise be used, preferably provided that they are coated with a hard coating such as epoxies, urethanes, elastomers, polyurea, minerals, cement, fiber cement, fiberglass, etc. Such foam board could also be mold-resistant and/or insect-resistant.

Because they are comprised of foam board, the bodies of the panels can be cut, shaped and/or configured as including decorative elements, such as flat surfaces, grooved surfaces, lapboard, log shapes for log cabin look, brick patterns, rock or stone patterns, etc. The decorative elements could be formed any number of ways, including but not limited to stamp embossing panels, shaping the features thereon/therein, fastening structure to the panels, melting the decorative element therein, etc. The panels can also be colored and/or covered with various finishing treatments, as desired, to further add to their appearance. This variety of panel shapes and configurations (including how they are configured for attachment to one another) allows a designer and/or an installer great freedom in creating decorative patterns in the structure's covering.

When a non-foam decorative element is attached to the foam body, a masonry or other saw may be utilized to cut the panels to a desired shape.

Figure 8:
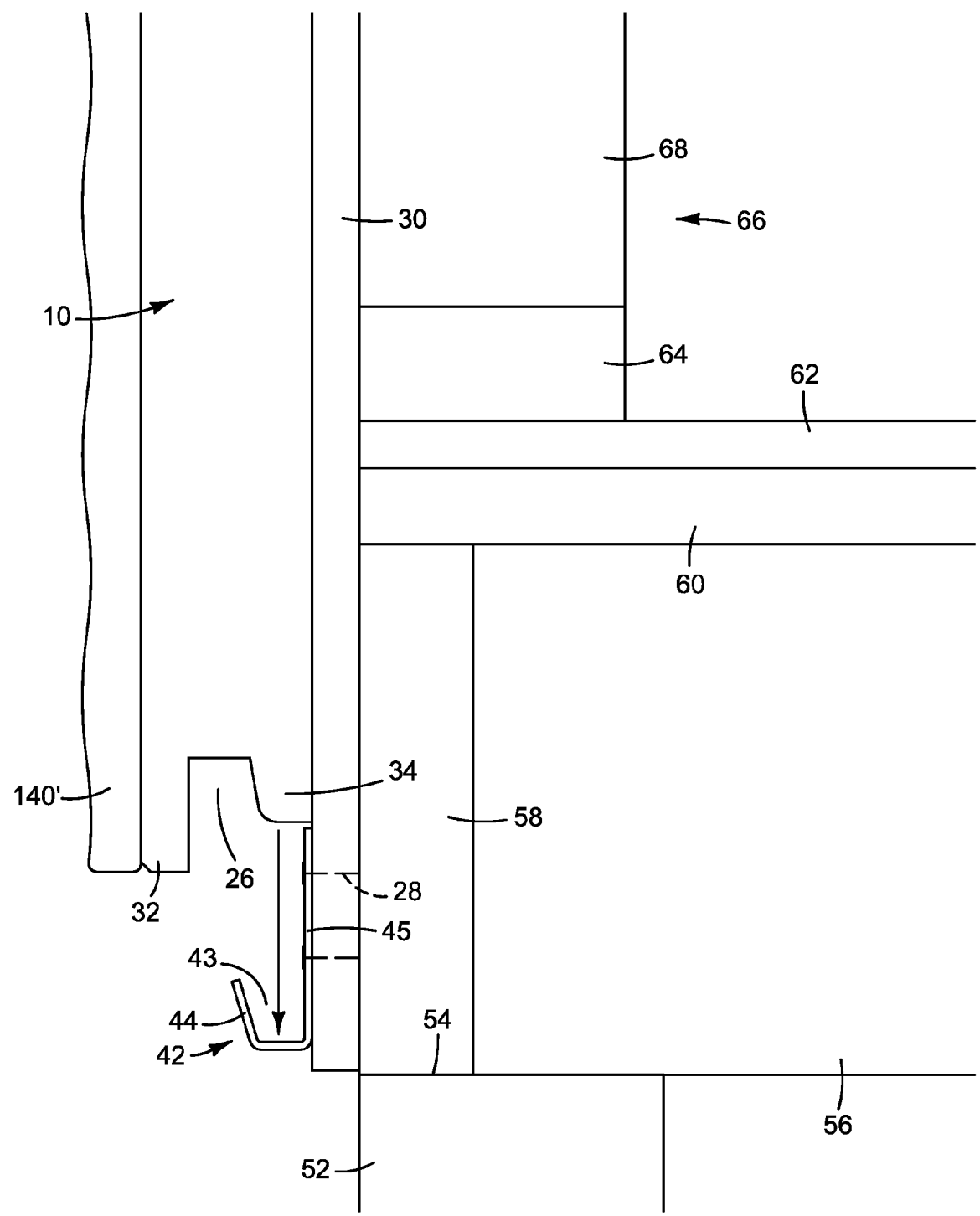
FIG. 8 is a partial, side view of a panel (of FIG. 1) about to be connected with a starter section (of the embodiment of FIG. 2), also showing the building structure.
Figure 9:
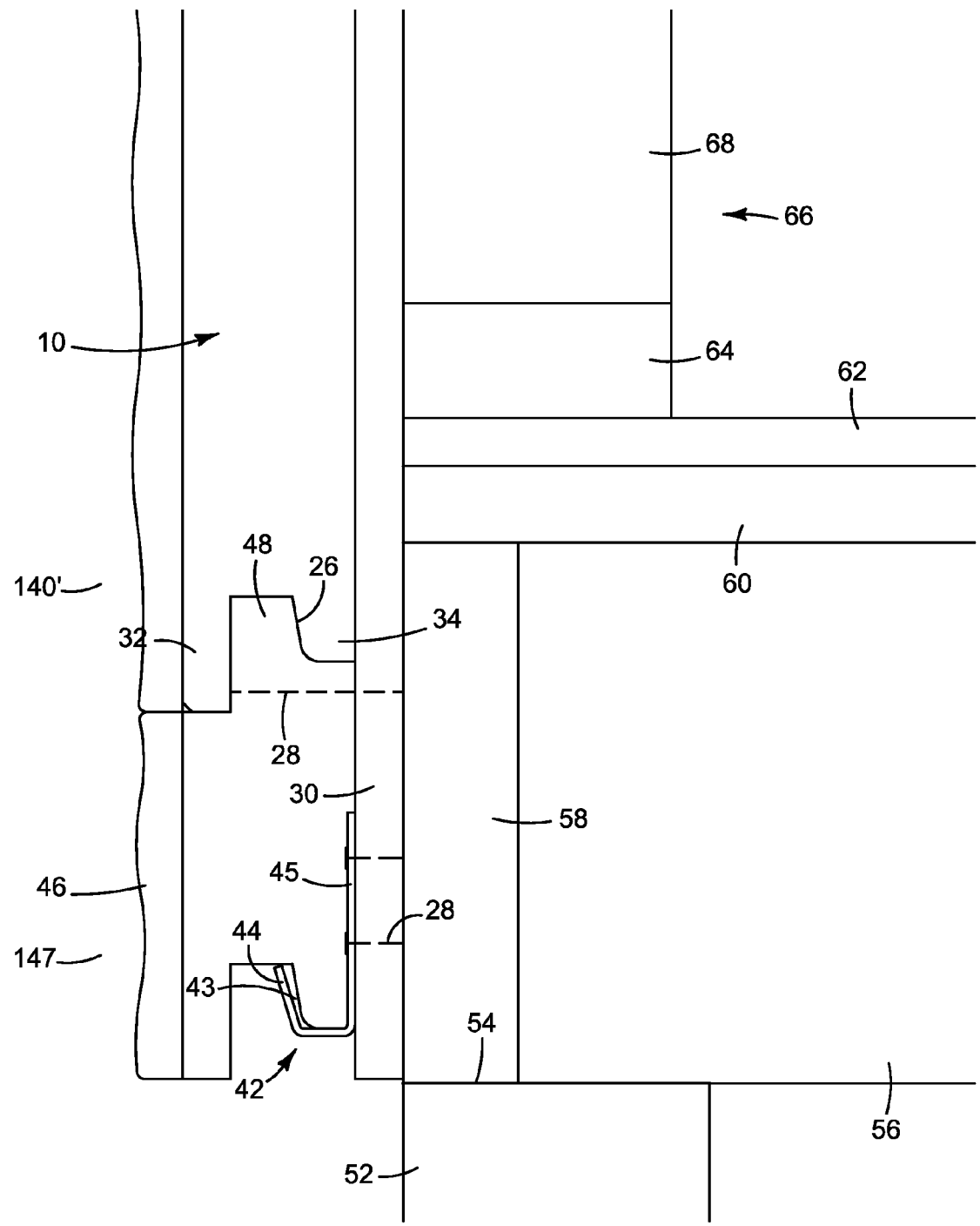
FIG. 9 is a partial, side view of a panel (of FIG. 1) connected to a block out (of FIG. 4) connected with a starter section (of FIG. 2), also showing the building structure.

The embodiments shown in the Figures show a decorative element applied to the first planar (face) side of the panel. This decorative element represented by a number of call out numbers, including 140 (FIGS. 1, 6-8, 10-11), 140' (FIGS. 6-7, 9), 131 (FIG. 10), 151 (FIG. 12), 151' (FIG. 12), 147 (FIGS. 4, 9). The decorative element can be formed into the panel, adhered to the panel, attached to the panel, etc. The decorative element (wainscot) could represent any number of different decorative features, including, but not limited to, rock, stone, block, and brick).

The panels are configured to be interlocking and for being generally water/air tight. Being interlocking prevents water from traveling through the tongue and groove of the panels and/or from running horizontally (like lapboard siding typically does), thereby preventing water damage and/or mold.

Referring to FIG. 1, shown is a panel 10 having a top side 12, a bottom side 14, a first side and a second side. The panel 10 also having a face side 20 and a back side 22. A decorative element 140 attaching to the face side 20, preferably through use of an adhesive (e.g., 100% silicone).

It is preferred that one or more of the top/bottom/first/second sides of the panel 10 is configured to interlock with one or more adjacent panels. The preferred manner of interlocking is through use of "tongue and groove" style interlocking. By such interlocking (overlapping/abutting), water and vapor flow is blocked and the resulting damage is prevented. In such a tongue and groove arrangement, at least one of the sides has a tongue or other flange extending there-from. This tongue is for receipt into a groove on a second panel. While the phrase "tongue and groove" is used herein, such exact functionality is not required, for instance opposing flanges are intended within the definition of "tongue and groove."

Referring particularly to FIG. 1, the top side 12 has a tongue 24 defined extending there-from, and the bottom side 14 has a groove 26 defined therein. The tongue 24 defined by an outside rabbet 23 and an inside rabbet 25. The groove 26 defined by an outside flange 32 and an inside flange 34.

Figure 7:
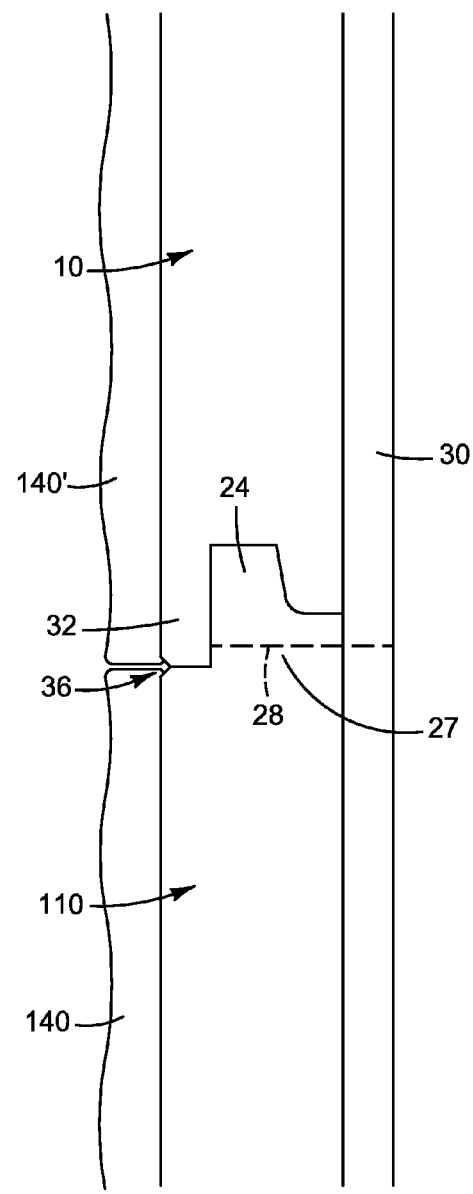
FIG. 7 is a partial, side view of two panels (of FIG. 1) connected together, also showing the sheathing.

As is shown in FIGS. 6-7, the tongue 24 of a first panel 110 is configured for interlocking receipt into the groove 26 of a second panel 10 to form a tongue and groove joint 36. FIG. 6 showing the two panels (10, 110) unlocked, whereas FIG. 7 shows the two panels interlocked. In the embodiment shown in FIGS. 6-7, the panels (10, 110) generally have one and one-half inches of overlap (shiplap). Providing such a degree of overlap may make a building wrap (such as DuPont Tyvek®) optional, depending on code requirements. FIGS. 6-7 showing another feature of the inventive concept(s), namely the covering up the fastener heads/holes. The fastener 28 would clearly be visible from the outside (left) in FIG. 6. As the connection is made (FIG. 7), the outside flange 32 overlaps the tongue 24, thereby hiding the head of the fastener 28. Overlapping in such a manner is very aesthetically pleasing because the fastener heads cannot be seen.

Such tongues and grooves can be formed in a number of ways, including but not limited to being cut or otherwise formed in the foam and being made from a separate material (metal, plastic, etc.) that is attached to the panel side (for example, by adhesives or fasteners).

Preferably, as is shown in FIGS. 6-7, 22 and 26-28, the tongues (24, 183, 188) are configured to provide a fastener receiving portion (27, 127, 127') through which a fastener 28 can be driven through and into a surface 30. This fastener (28, 128, 128') thus used to attach the panel 10, 180 to the surface 30. These fasteners are preferably used every three to twelve inches along the tongue side of the panel, however other spacing is possible. It is preferred that the fastener receiving portion 127, 127' be located so that the fastener is driven into the tongue above the outside rabbet 182 and into the body of the panel 180 below the inside rabbet 187, thereby providing a rigid connection point. FIG. 27 showing fasteners extending through both the upper fastener receiving portion 127 and the side fastener receiving portion 127'. In other embodiments, only one of the fastener receiving portions may receive a fastener. Because EIFS and masonry walls do not allow for the difference in expansion/contraction coefficients between the wall and the veneer, it is preferred that the interlocking panels be independently secured to the wall on two of the side (for instance the top side 281 (having the tongue 183) and the second end 284 (having the tongue 188), thereby allowing the panels to expand and contract with changing weather conditions, settling, normal building movement and other phenomena's such as, earthquakes.

The term "surface" 30 when used herein intended to represent not only the outside or exterior "surface" of the building structure, but also includes any and all construction materials that the panel and associated components can be attached to, such as a sheet of OSB, sheathing, plywood, drywall, etc., regardless of their location on the structure (e.g., exterior, interior).

Figure 10:
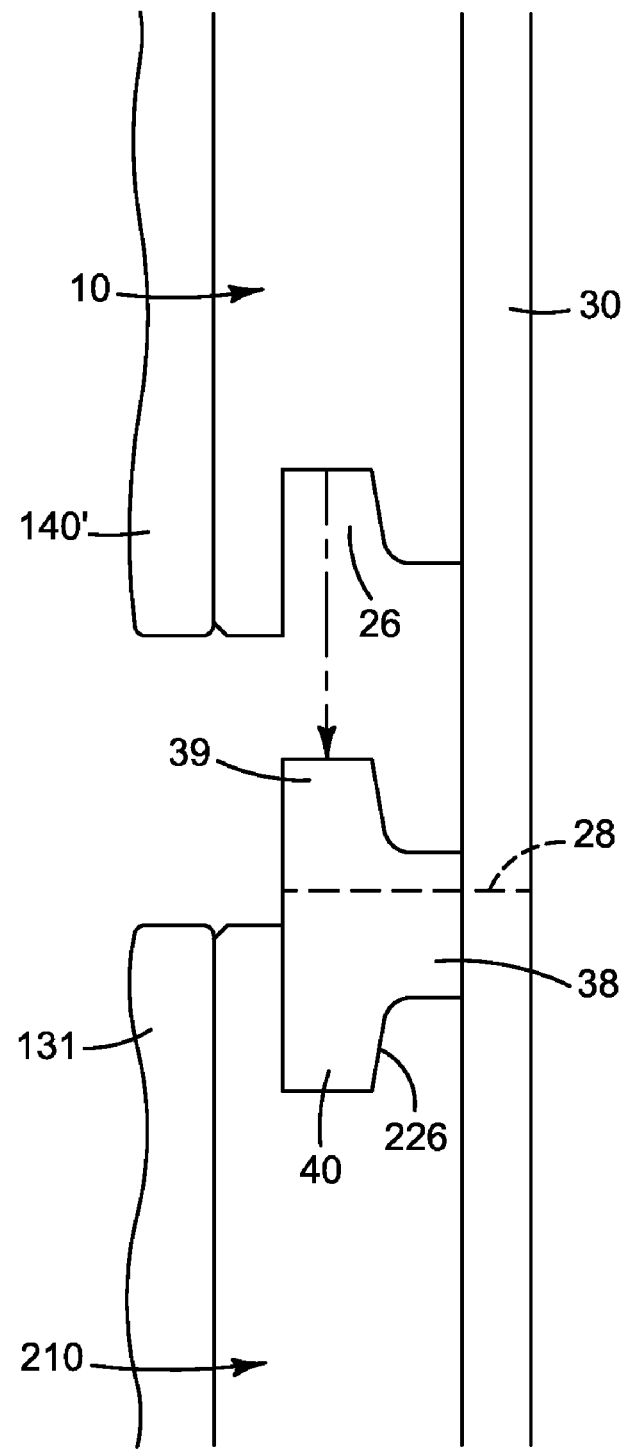
FIG. 10. is a partial, side view of a panel (of FIG. 1) connected to an adapter (of FIG. 3) connected to a third panel, also showing sheathing.

It may be desirable to have tongues on at least one of the horizontal ends as well as on the vertical ends, and grooves on one of the horizontal ends and one of the perpendicular ends. Such an arrangement would allow adjacent panels to interlock together and would allow the panels to be installed either vertically or horizontally in a continual pattern to achieve a desired height or width. However, do to the layout used in constructing the wall (for instance, it may be advantageous to start at the ends of the wall and work towards the center), situations may arise where adjacent panels are not configured for such "tongue and groove" interlocking, for instance, as shown in FIG. 10, where the two panels (140, 210) to be joined both have grooves. In such a case, it may be useful to use a female-to-female adapter 38 (shown in FIGS. 3 and 10) having a pair of opposing tongues (39, 40) that can be installed into the grooves (26, 226) to allow the two panels to interlock. It is preferred that such an adapter be configured for fastening, for instance through use of the fastener 28 shown) to the surface 30. In such an instance, a special overlapping piece may be necessary to join in the center.

It is preferred that, on the panels, the tongue be consistently on one side (left or right) and the top, with the groove on the other side and the bottom. If the side grooves are reversed, the panels must be left and right handed and cannot be rotated interchangeably. Further, panels can be made with the tongue on top and the groove on the other edges, with the utilization of an adapter that can be glued or otherwise fastened into a groove to provide a tongue as required.

Using such interlocking joints allows for expansion and contraction to take place, something that traditional foam/stucco methods, such as the EIFS, 2- and 3-part systems mentioned previously, are not particularly effective at doing. Because EIFS doesn't account for such expansion and/or contraction, oftentimes cracking in the finish results.

As discussed above, the panels can be fastened to the structure through use of at least one fastener (e.g., screw, staple, nail), inserted through the tongue (as shown in FIGS. 6-7, 10). An adhesive (preferably a 100% silicone, or low temperature urethane adhesive, preferably one that can be applied down to −20 degrees F.), or a waterproof sealant (i.e., caulk, paintable silicone), could further be used on the tongue and groove joints, as well as any other locations that could be permeated by water or vapor, to sealed such joints and connections water tight.

Figure 35:
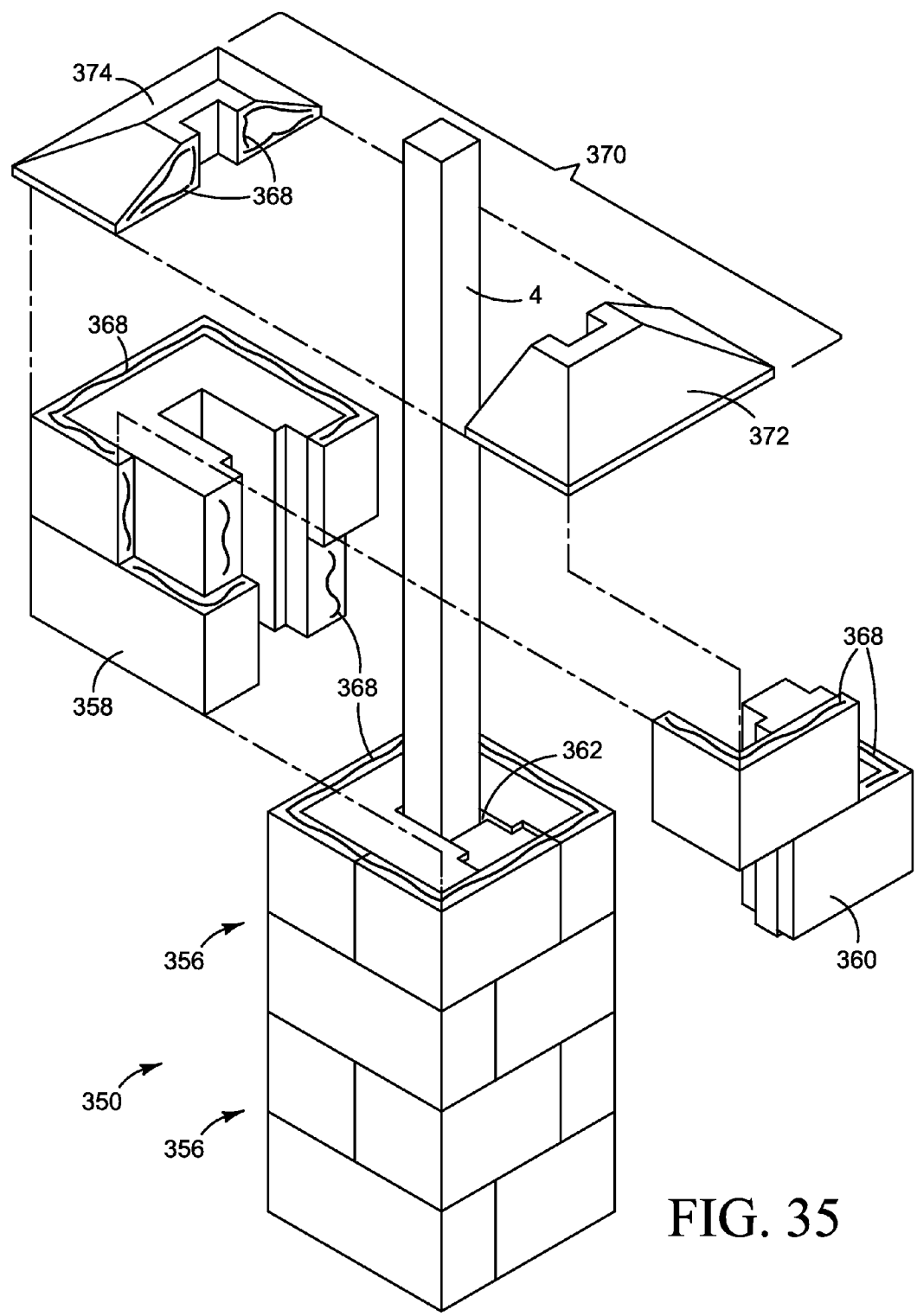
FIG. 35 is an exploded, perspective view of the column of FIG. 30, shown installed on a post showing a solid cap piece.
Figure 36:
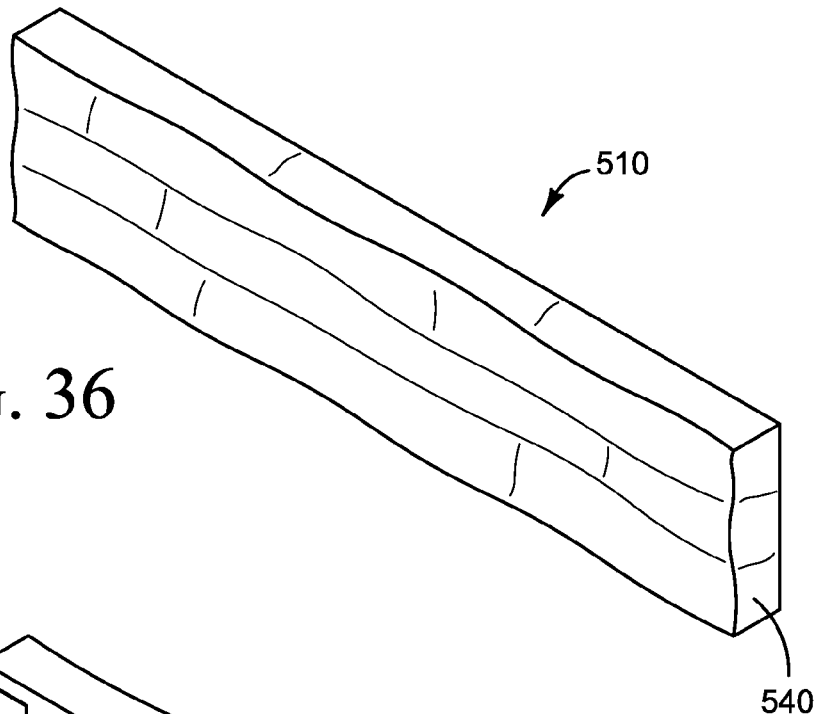
FIG. 36 is a front perspective view of a wall panel.
Figure 37:
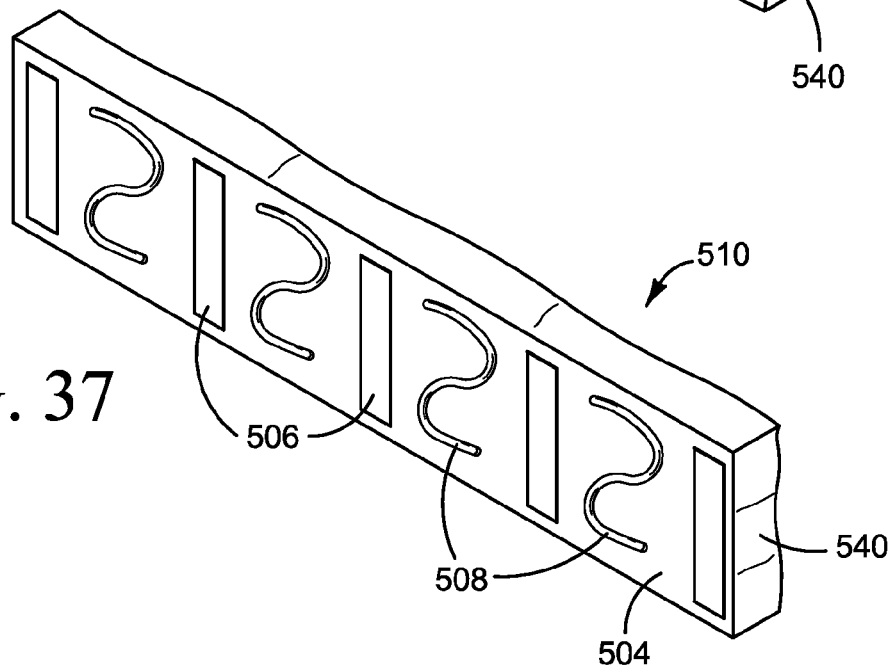
FIG. 37 is a rear perspective view of the wall panel of FIG. 36.

The embodiment of FIGS. 36-37 showing a polygonal wall panel 510. The panel 510 being a quadrilateral, however other shapes, including polygons, as well as non-polygon shapes, are likewise envisioned. The panel 510 having a decorative portion 540 on a front side. The back side 504 of the panel 510 having applied there-to at least one double sided adhesive tape strip 506 and at least one bead 508 of an adhesive. Such a panel configured to be applied to a wall surface (e.g., an inside wall, a column (including the stackable columns shown in FIGS. 30-35), by removing the covering from the double sided tape to expose its adhesive outside, applying one or more beads of an adhesive (e.g., caulk, tube adhesive) to the back side 504, and then sticking the back side of the panel to the wall surface. The term "wall surface" including, but not limited to wallboard, drywall, tile backer, paneling, and hard board. In such a manner, an individual could build a faux brick or stone covering surface upon a wall surface, with the tape holding the panel to the wall surface until the adhesive fixes the panel there-to. The utilization of incremental sized stones is preferred, in that it allows the pattern to be assembled like a puzzle. The backer portion and the decorative portion are preferably formed of an artificial stone material. While real stone could be utilized, the preferred artificial stone material comprises a lightweight concrete of Portland cement, pumice, admix chemicals and water, mixed and poured into a mold. Decorative impressions, reliefs, color and other indicia can be applied to the surface of the decorative element to enhance its appearance. This description of one way to make the decorative element not intended as a limitation on the inventive concept. All other manners of making such a panel 510 are possible as well. It is preferred that the back surface be cleaned, for instance using rubbing alcohol, before the double sided tape is adhered there-to.

For external application, it is preferred that the vertical seams be sealed, while the horizontal seams are not. This allows the wall system to ventilate vapor and/or moisture out from the interior portions of the building structure while inhibiting exterior water penetration. Further, the backsides of the panels could be vertically or diagonally grooved to assist in the evacuation of moisture/condensation.

Figure 13:
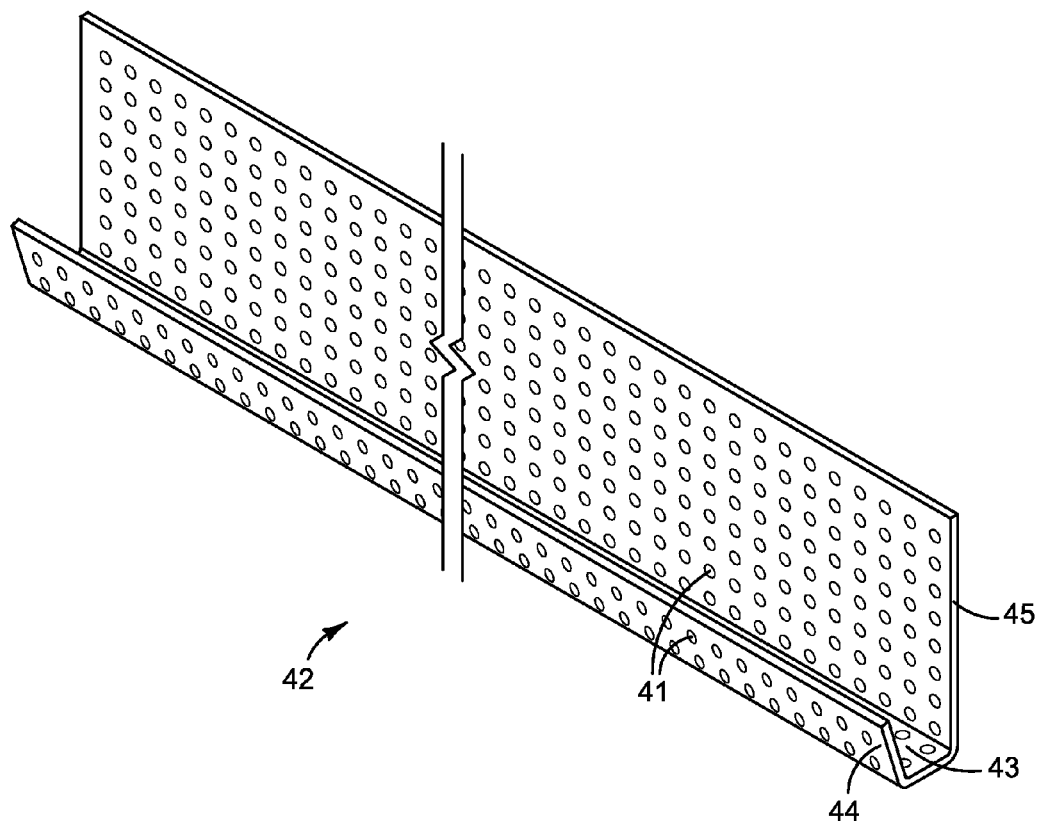
FIG. 13 is a perspective view of a starter piece.

Referring now to FIGS. 2 and 13, shown is a starter section 42. Starter sections 42 be used on at least a portion of the bottom side, preferably the entire bottom side, of the panels as they terminate adjacent the ground (as shown in FIGS. 8-9), can be used between panels, etc. For instance, FIG. 8 shows the starter section 42 having a tongue 44 configured for receipt into the groove 26 of the panel 10, and FIG. 9 shows the starter section 42 having a tongue 44 configured for receipt into the groove 50 of the block out panel 46 (discussed below). The preferred starter section is preferably comprised of a metal. Other starter section configurations include but are not limited to pieces of EPS foam, and plastic structures generally shaped to fit the groove with a defining channel therein to receive the bottom edge of a siding panel therein. Preferably, at least one fastener 28 would be utilized to attach the starter section 42 to the structure's wall surface 30. The starter section can be the first general structure attached (using fasteners) mounted to the wall surface, providing a flange (or groove) that the lowermost siding panel bottom edge mates with.

FIG. 4 shows a "block out" (also referred to as a "design band" or "pop out") 46 having a tongue 48 and a groove 50. A decorative element 147 is shown attached to the face side of the block out panel's body. FIG. 9 shows this block out 46 installed on a wall surface 30, where the tongue 48 is configured for receipt into the groove 26 of a connected panel 10. The groove 50 of the block out receives therein the adjacent tongue, for instance the tongue 44 of a starter section 42.

FIGS. 5, 14, 15 and 29 showing embodiments of drip cap pieces (70, 170, 170'). The drip cap piece 70 of FIG. 5 having at least one open end which allows the groove 150 to be visible, as does the drip cap 170 of FIG. 29. Whereas the drip cap piece 170' of FIGS. 14-15 have closed distal ends (the groove is not visible). The drip cap pieces having a flat upper surface. The lower surface comprising the groove 172 (150 in FIG. 5) defined between a front flange 171 and a rear flange 173 configured for attachment to a tongue of a panel. The drip cap pieces serving as a drip cap for a wall, but may also serve other functional purposes, for instance as a plant shelf or window sill. It is preferred that when a rail section is used under a window, the tongue section of the rail would be removed and the rail sealed with caulk to the window.

FIGS. 8 and 9 further showing, for purposes of representation, general structure that may or may not be present in a common structure upon which these embodiments are installed. Disclosure of this structure is intended to supplement the reader's understanding of general concepts and are not necessarily intended to be required structure in any structure. Specifically, these Figures showing a foundation wall 52 upon which a floor joist 56 rests. Typically, a moisture barrier 54, such as a sill seal gasket, would be sandwiched between the foundation wall and the floor joist. The floor joist(s) connect with one or more rim joists 58 which cooperate to support a sub-floor 60. An underlayment 62 is placed over the sub-floor 60. The bottom plate 64 of a stud wall 66 rests on the sub-floor, this stud wall comprising a plurality of studs 68. The outside surface of the stud walls having wall sheathing or other surface 30 attaching there-to. The term "sheathing" including but not limited to OSB, plywood, particle board, wood products, metal coverings, plastic coverings, composite coverings, concrete board, ceramic fiber board, fireproof materials, etc. Again, this description merely intended as a general discussion of components typically found in a common framed building structure.

Referring now to FIG. 11, shown is a top view showing three stud walls 66, showing both an inside and an outside corer. Sheathing 30 covers the stud walls. Attached to this sheathing is a plurality of panels 10. The panels 10 overlapping one another to cover the corner. Alternatively, the panels could be directly attached to the studs (without sheathing).

Referring now to FIG. 12, shown is another embodiment of the inventive concept(s). This embodiment showing the provision of a tongue 78 that is separate from the panels (310, 310') themselves. Utilization of a such tongue would allow a single form of panel to be used, whereby (if the double tongued section is used and all the panels are grooved all the way around) by merely flipping the panel one-hundred-eighty degrees and inserting the tongue would allow it to mate up with another panel section. In such an arrangement, a fastener 28 could be used to fasten the tongue to the panel 310' (310) and to the sheathing 30. Adhesive could likewise be used.

A foil coating and/or film could be applied to the back (inside/house) side of the panels, this foil or other coating serving as additional R-value, as a moisture barrier, and/or providing a location for installation, instructions and other written materials to be printed.

Referring now to FIGS. 13-29, shown is another embodiment of a wall covering of the inventive concept(s). FIG. 13 showing a perspective view of the starter section 42 shown in FIG. 2. The starter section 42 preferably being J-shaped, having a tongue portion 44 and a wall flange 45. It is preferred that the starter section, more preferably, the wall flange 45, have predefined there-through a plurality of holes 41 for receiving a fastener there-through. The starter section 42 configured for fastening (through use of said fasteners) to a wall surface, such as at the bottom of an external wall, as the bottom, attaching to the sheathing. The J-shape defining a channel 43 between the tongue portion 44 and the wall flange 45. The channel 42 for receiving a panel's bottom tongue (e.g., 163, 183, 193), with the tongue portion 44 received into the panel's bottom groove (e.g., 164, 184, 194).

Figure 15:
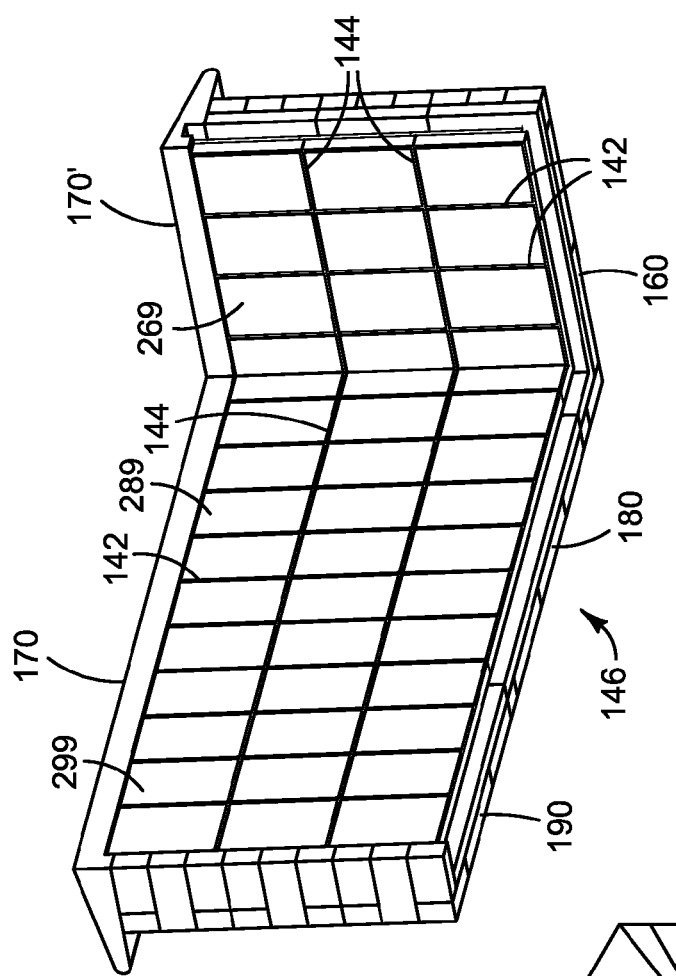
FIG. 15 is a rear perspective of the wall of FIG. 14.
Figure 14:
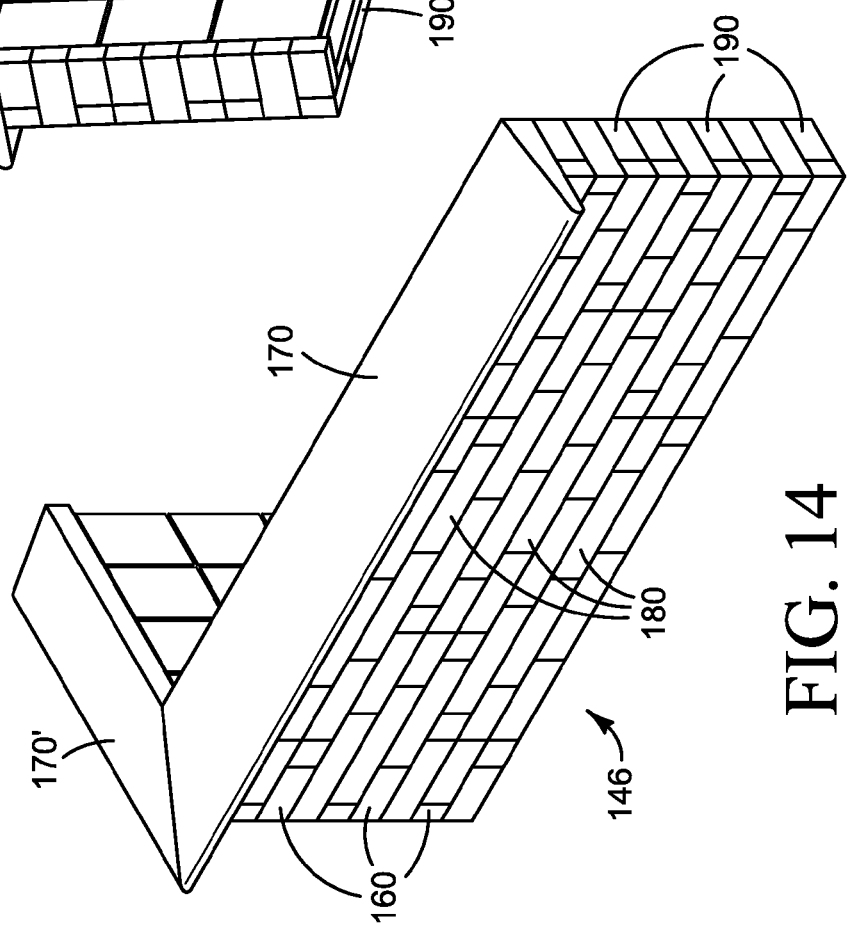
FIG. 14 is a front perspective view of a wall.
Figure 17:
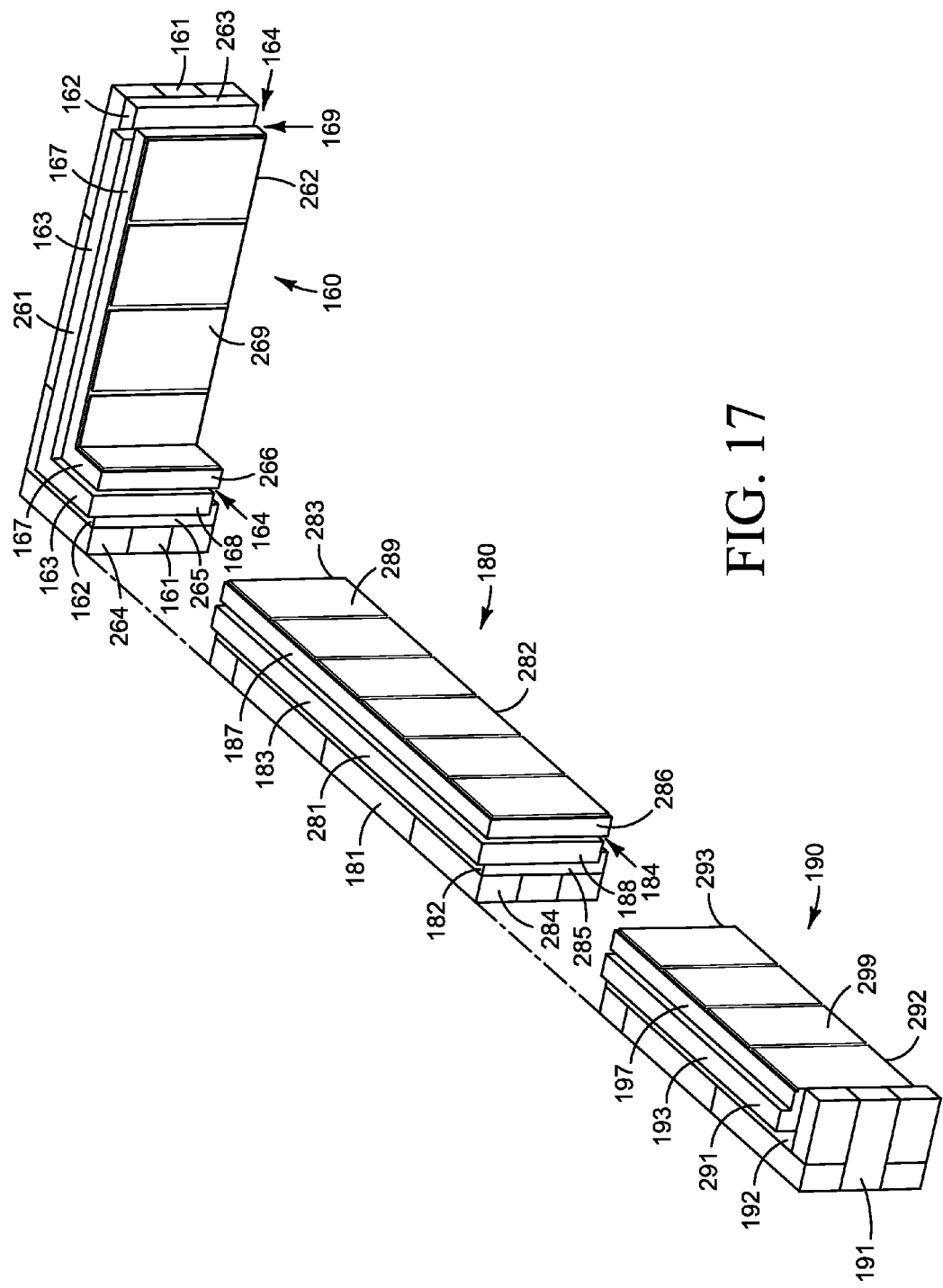
FIG. 17 is a first perspective, partial, exploded view of a portion of the wall of FIG. 14, showing an end piece, a flat piece and a corner piece.
Figure 18:
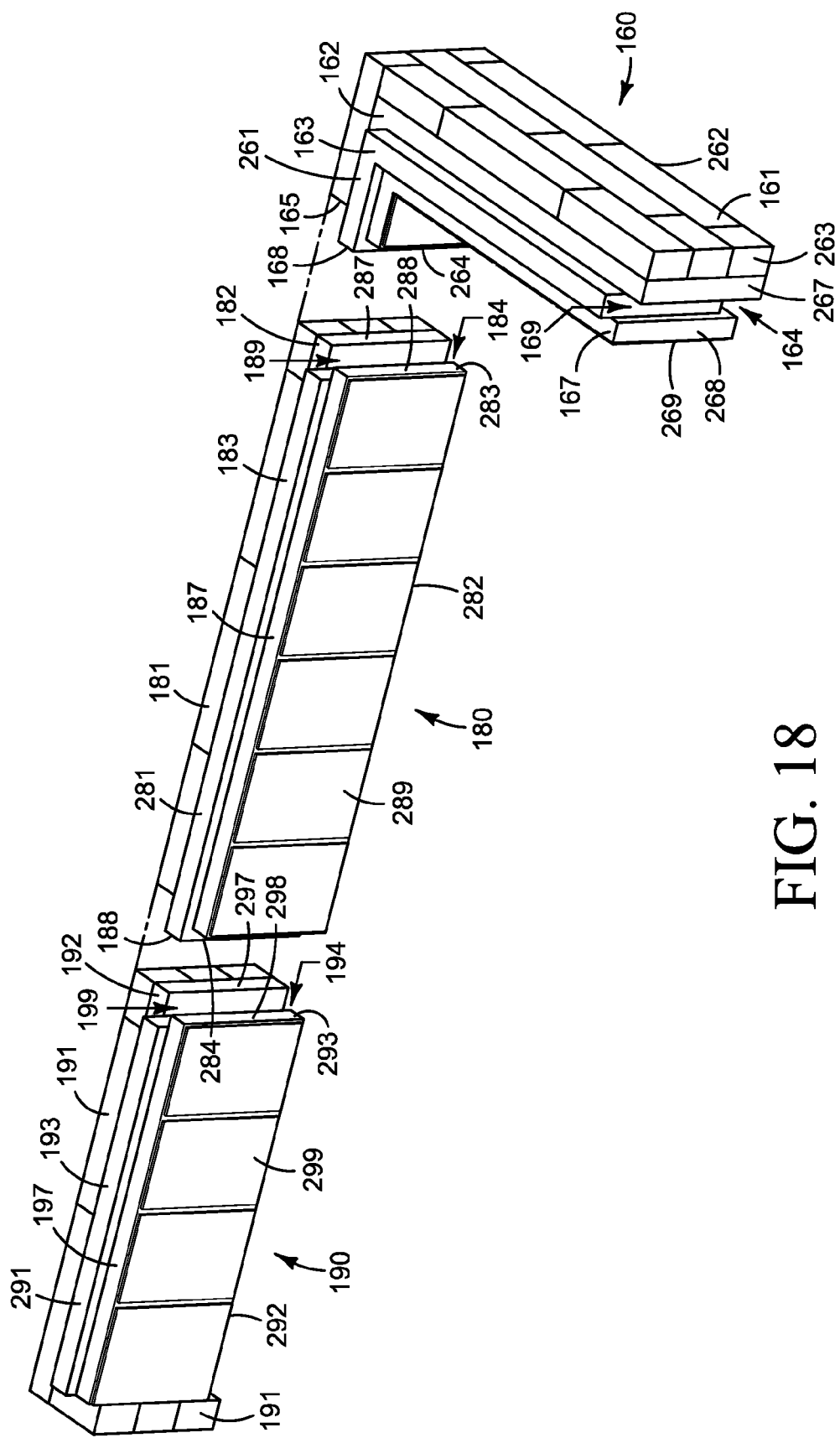
FIG. 18 is a second perspective, partial, exploded view of a portion of the wall of FIG. 14, showing an end piece, a flat piece and a corner piece.
Figure 19:
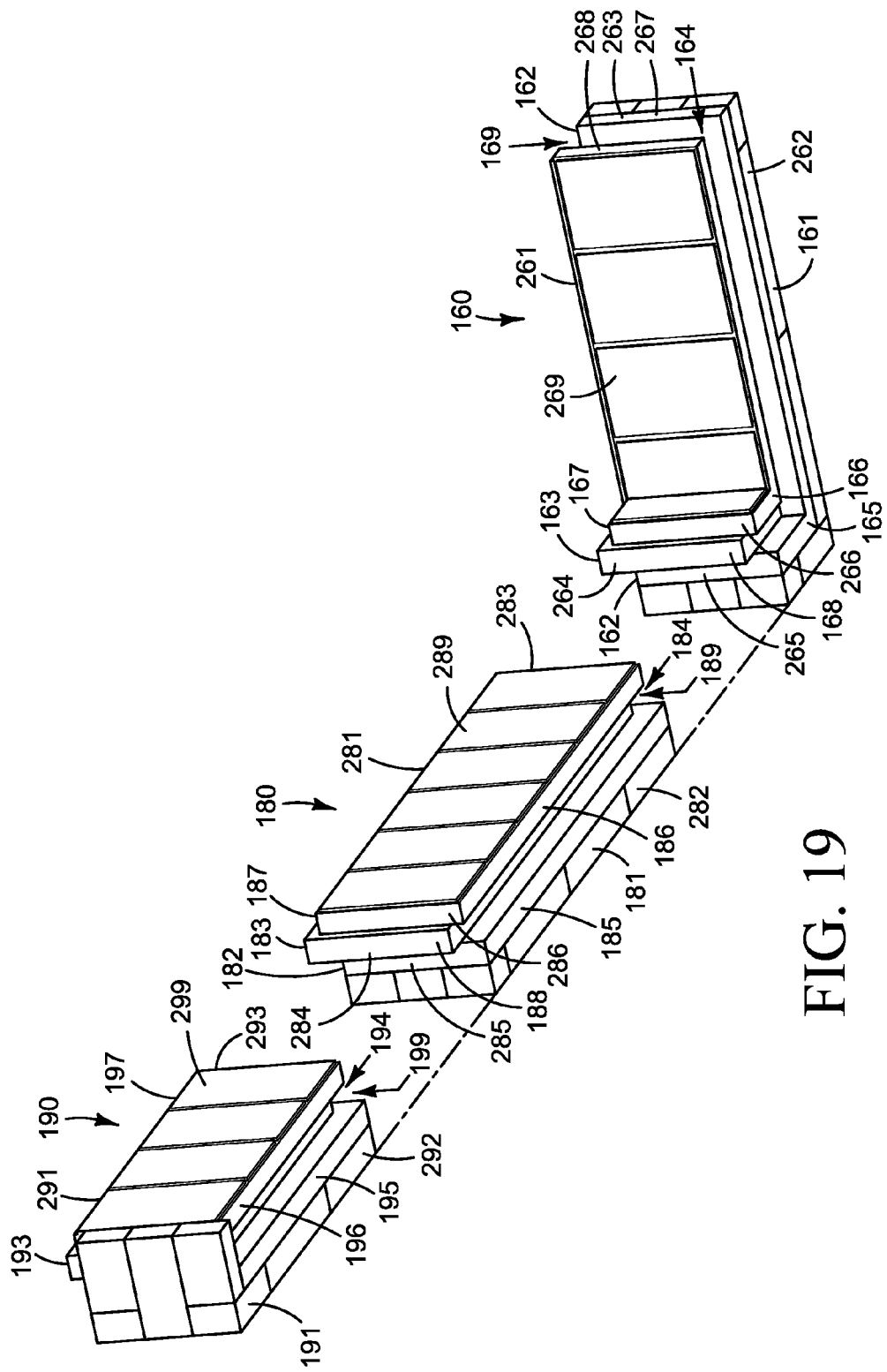
FIG. 19 is a third perspective, partial, exploded view of a portion of the wall of FIG. 14, showing an end piece, a flat piece and a corner piece.
Figure 29:
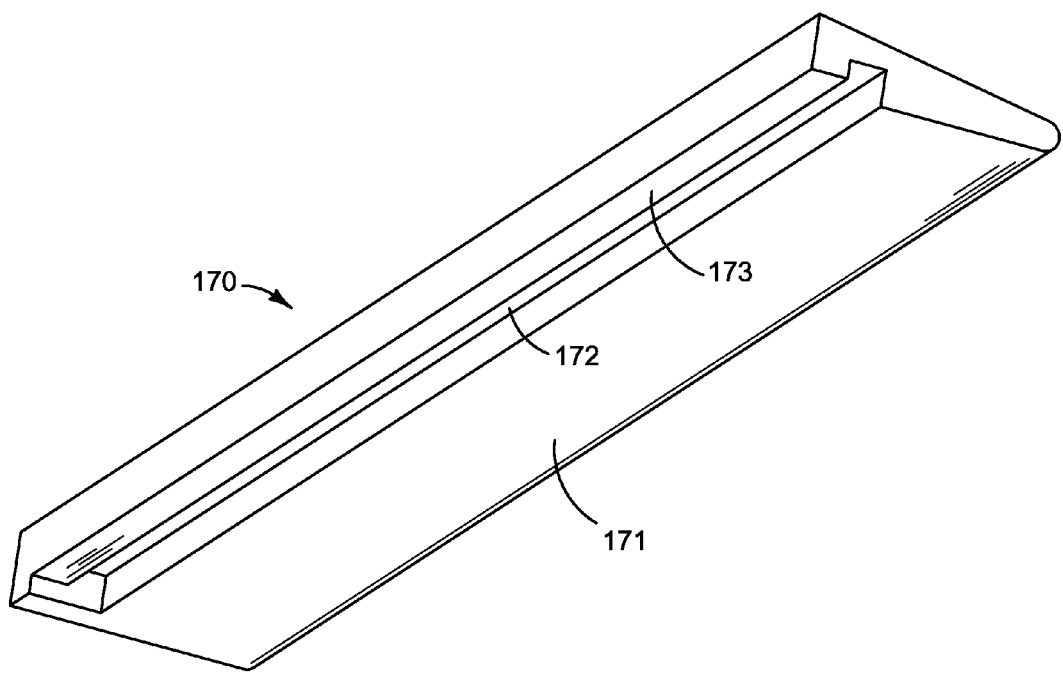
FIG. 29 is a perspective, bottom side view of a cap piece.

FIGS. 14-16 showing an assembled wall covering 146 (sans structural wall) assembled from components of the inventive concept(s). The wall covering 146 comprising a number of corner panels 160, flat panels 180, and end panels 190 which are joined into horizontal rows of panels, the third horizontal row shown exploded. The components capped with a cap piece (170, 170'). This embodiment of a cap piece formed to join at a 45 degree angle at the corner. FIG. 15 showing that the back side of the panels preferably includes a plurality of vertical channels 142 and horizontal channels 144 therein. These channels drainage/ventilation grooves for allowing moisture drain and ventilate from behind the panel. Preferably, these channels are ¼-inch wide to 2-inches wide, and ¼-inch deep. It is preferred that the channels be regularly spaced, for instance, 2-inches apart (from groove edge to groove edge).

FIGS. 17-21 showing a horizontal section of the wall covering 146, comprising a corner panel 160, a flat panel 180, and an end panel 190. The bodies of the panels having face sides (between the body and the decorative element) and back sides opposite thereto.

The corner panel 160 comprising a body 269 and preferably a decorative element 161. The body 269 preferably comprising foam. The corner panel 160 having a top side 261 having a tongue 163 defined extending there-from, and the bottom side 262 has a groove 164 defined therein. The tongue 163 defined by an outside rabbet 162 and an inside 167. The groove 164 defined by an outside flange 165 and an inside flange 166. The corner panel 160 having a first end 263 having a side tongue 168 defined extending there-from, and the second end 254 has a groove 169 defined therein. The side tongue 168 defined by an outside rabbet 265 and an inside rabbet 266. The groove 169 defined by an outside flange 267 and an inside flange 268. The corner panel is preferably a right angled corner, but other corner angles and configurations are possible. A second embodiment of a corner panel 160' is shown in FIG. 20.

The flat panel 180 comprising a body 289 and preferably a decorative element 181. The body 289 preferably comprising foam. The flat panel 180 having a top side 281 having a tongue 183 defined extending there-from, and the bottom side 282 has a groove 184 defined therein. The tongue 183 defined by a weather overlap rabbet 182 and a locking rabbet 187. The groove 184 defined by an outside flange 185 and an inside flange 186. A "flat" panel 180 could have a non-"flat" shape. The flat panel 180 having a first end 283 having a side tongue 188 defined extending there-from, and the second end 284 has a groove 189 defined therein. The side tongue 188 defined by an outside rabbet 285 and an inside rabbet 286. The groove 189 defined by an outside flange 287 and an inside flange 288. FIGS. 22-25 showing additional views of the flat panel. FIG. 22 showing a front view of a flat panel 180, FIG. 23 showing a top, plan view of a flat panel 180, FIG. 24 showing a first end view of a flat panel 180, and FIG. 25 showing a stacked pair of flat panels. In FIG. 22, the dotted lines illustrate how in this embodiment, the flanges, rabbets, grooves and tongues are comprised of three generally identical polygon shapes that have been offset stacked.

The end panel 190 comprising a body 299 and preferably a decorative element 191. The body 299 preferably comprising foam. The end panel 190 having a top side 291 having a tongue 193 defined extending there-from, and the bottom side 292 has a groove 194 defined therein. The tongue 193 defined by an outside rabbet 192 and an inside rabbet 197. The groove 194 defined by an outside flange 195 and an inside flange 196. The end panel 190 having a first end 293 having a groove 199 defined therein. The groove 199 defined by an outside flange 195 and an inside flange 196. The end panel 190 shown in FIGS. 17-19, and 21 comprising a "right" end. A generally mirror image of the "right" end panel could be made, thereby configured as a "left" end panel 190', as shown in FIG. 20. As with these panels, and all of the panels, they can be cut to size, as necessary. The end panels can be utilized as corners as well.

The top tongue (e.g., 163, 183, 193) of a first panel is configured for interlocking receipt into the bottom groove (e.g., 164, 184, 194) of a second panel to form a tongue and groove joint. The first end tongue (e.g., 168, 188) of a first panel is configured for interlocking receipt into the end groove (e.g., 169, 189, 199) of a second panel.

The embodiments utilizing a tongue and groove connection means. While discussed below is one such embodiment of the tongue and groove connection, whereby the panels have two tongues and two grooves, other configurations are possible as well.

Attaching to the outside surface of the base panel's body is preferably a decorative element (e.g., 161, 181, 191). It is preferred that the decorative element comprise a synthetic stone surface. The term "synthetic stone" including, surfaces comprising or simulating bricks, tile, masonry, rocks, stones, and/or grout. The synthetic stone decorative element can be made from actual stones/rocks, or can be made from synthetic stones/rocks. Preferably, no foam is included in said synthetic stones/rocks.

Some embodiments do not have a separate decorative element, but instead, the foam body of the panel is cut, shaped and/or configured as including integral decorative elements, such as flat surfaces, grooved surfaces, lapboard, log shapes for log cabin look, brick patterns, rock or stone patterns, etc. The integral decorative elements could be formed any number of ways, including but not limited to stamp embossing panels, shaping the features thereon/therein, melting the decorative element therein, etc. The panels can also be colored and/or covered with various finishing treatments, as desired, to further add to their appearance. This variety of panel shapes and configurations (including how they are configured for attachment to one another) allows a designer and/or an installer great freedom in creating decorative patterns in the structure's covering.

In the embodiments shown in the figures, the decorative element is an artificial stone material. While real stone could be utilized, the preferred artificial stone material comprises a lightweight concrete of Portland cement, pumice, admix chemicals and water, mixed and poured into a mold. Decorative impressions, reliefs, color and other indicia can be applied to the surface of the decorative element to enhance its appearance. This description of one way to make the decorative element not intended as a limitation on the inventive concept. All other manners of making such a decorative element are possible as well.

The panels can be cut to shape, for instance cutting some of the panels shorter so as to allow for aesthetic orientations of seams. It is likely that installation of preconfigured panels will result in each row requiring the cutting of at least one of the panels, for instance by square cutting one or more of the top side, bottom side, first end or second end. After the panel is square cut, to abut the cut panel with an adjacent panel, any number of methods can be used, including but not limited to splicing the cut panel (as shown in FIG. 10), and square cutting the adjacent panel to create a "butt" splice" and using adhesives and/or fasteners to join the seam together.

FIGS. 30-35 showing a modular and stackable column system 350 comprising a column 354 and, preferably, a cap piece 370. Preferably, the column 354 comprises a number of modular sections 356, sized to be easily handled and manipulated by an installer, for instance, being only fifteen-inches high.

Preferably, the column modular sections 356 are able to disassemble into at least two pieces, such as first shell 358 and a second shell 360. It is preferred that thusly, the two shells define a passageway 362 for allowing a structural post 4, such as a length of four-inch by four-inch dimensional lumber, to extend there-through. It is preferred that the passageway be at least ¼-inch larger than the post, and that any gaps that exist after installation of the shells upon the post between the post and the passageway be filled with a silicone caulk or other filler/sealant.

The modular sections preferably comprise foam core covered by a decorative element, preferably resembling masonry or stone. For example, the decorative element could be manufactured of a lightweight concrete of Portland cement, pumice, admix chemicals and water, mixed and poured into a mold. Decorative impressions, reliefs, color and other indicia can be applied to the surface of the decorative element to enhance its appearance. This description is merely one way to make the decorative element not intended as a limitation on the inventive concept. All other manners of making such a decorative element are possible as well.

FIGS. 31-35 show one particular configuration for the column sections. While this configuration is shown in the drawings, it is not intended to be considered as the sole potential configuration, but is merely a preferred configuration. The first shell 358 is generally U-shaped, having a generally U-shaped core portion having the passageway 362 defined therein. In being U-shaped, the first shell 358 has at least a partially open side 364 enabling the first shell to be slid onto the post 4, as shown in FIG. 35. The second shell 360 having a key shaped core piece 366 configured for insertion into and closure of the first shell's partially open side 364, thereby allowing the post to be encased within the modular section. The key shaped core piece 366 attached within the first shell's partially open side preferably through the use of adhesives and fasteners.

The decorative elements could be formed of a single piece, or of multiple pieces. In the embodiment shown, the first shell has two decorative elements (359, 359') which comprise (in cross-section) a pair of generally square shaped polygonal shapes, each missing an L-shaped section in one of the corners. In the embodiment shown, the lower decorative element 359' is rotated one-hundred-eighty degrees relative to the upper decorative element 359. In such a configuration, when installed upon the core 357, the decorative elements not cover the open side 364.

Figure 30:
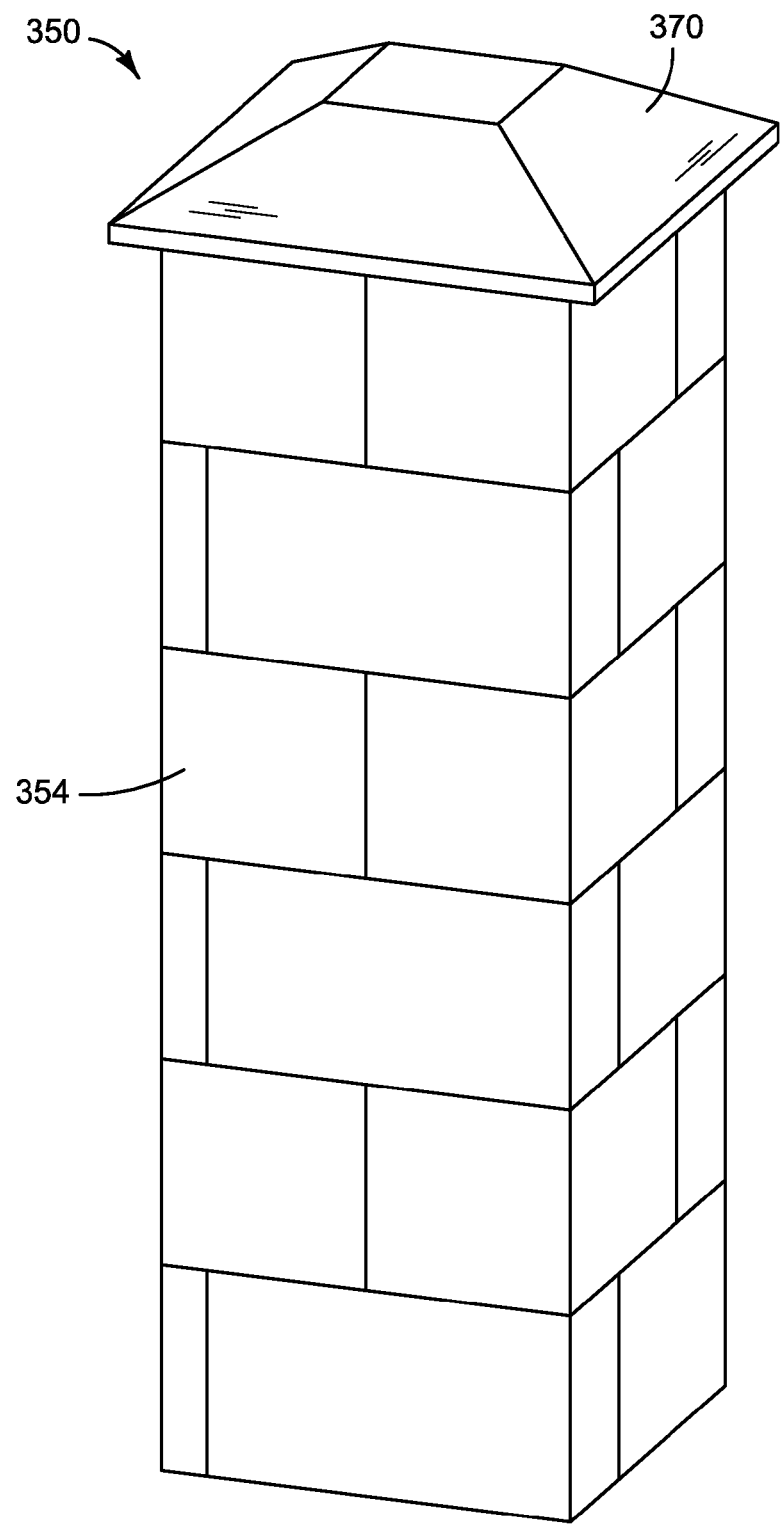
FIG. 30 is a perspective view of an assembled column.
Figure 31:
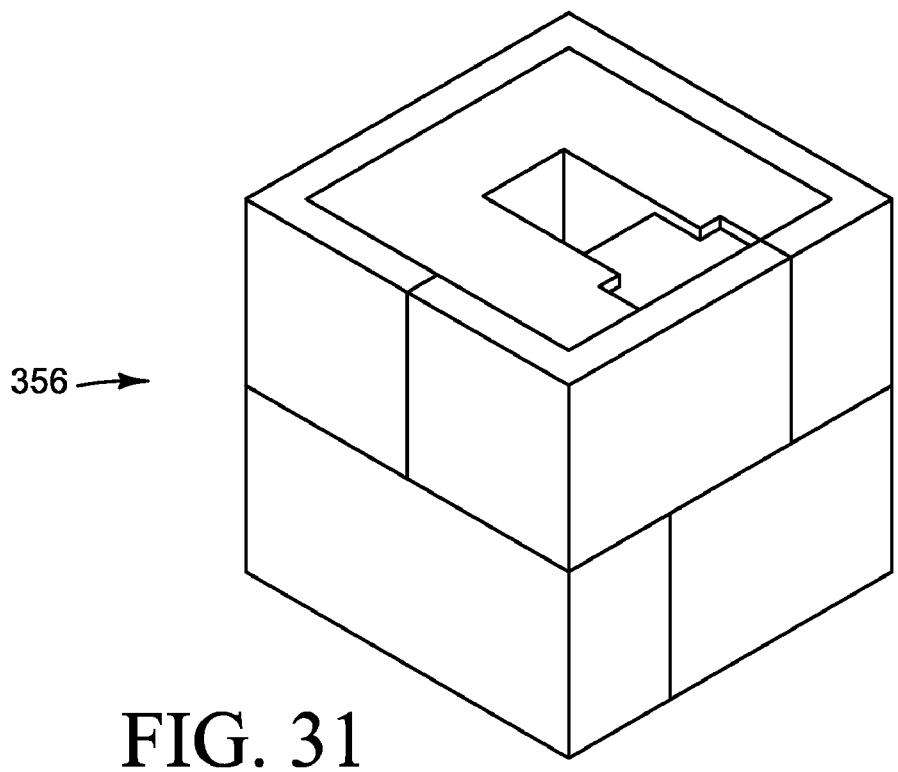
FIG. 31 is a top perspective view of a column section.
Figure 32:
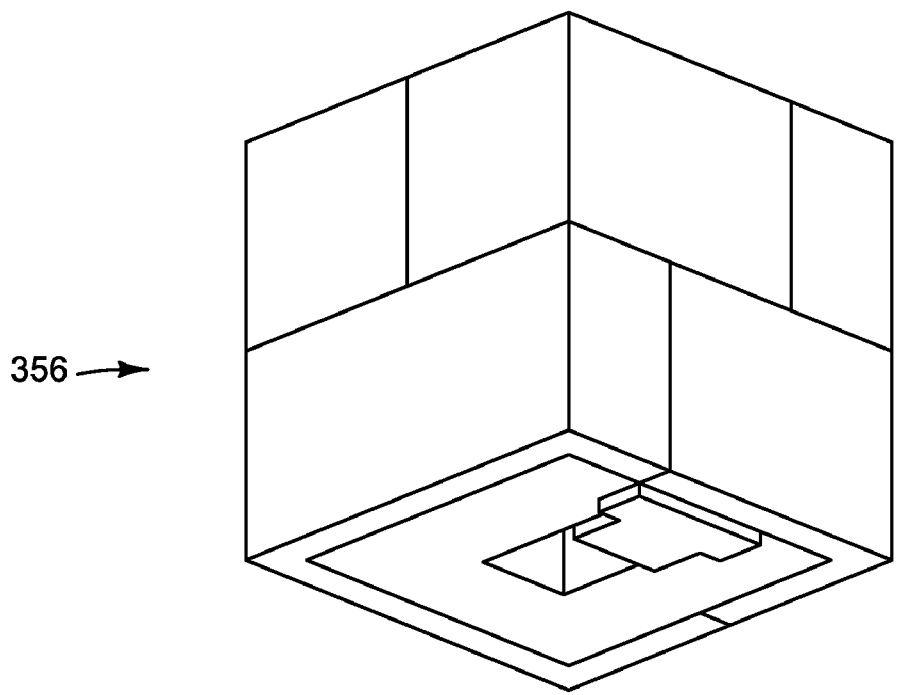
FIG. 32 is a bottom perspective view of the column section of FIG. 31.
Figure 33:
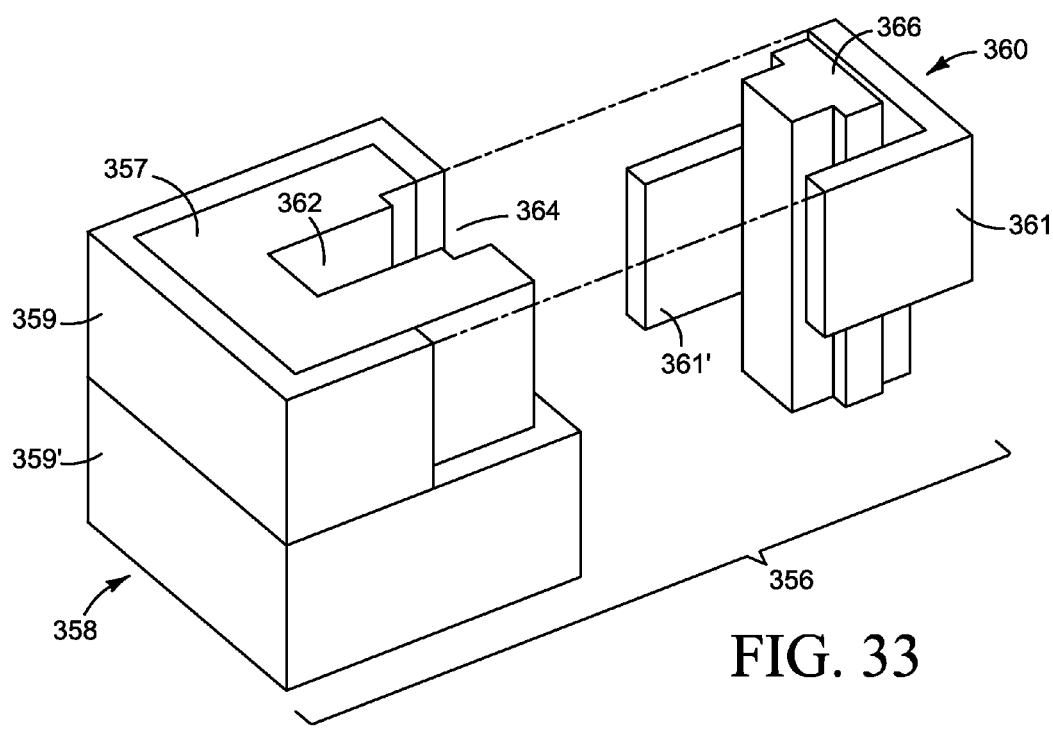
FIG. 33 is a top, exploded, perspective view of the column section of FIG. 31.
Figure 34:
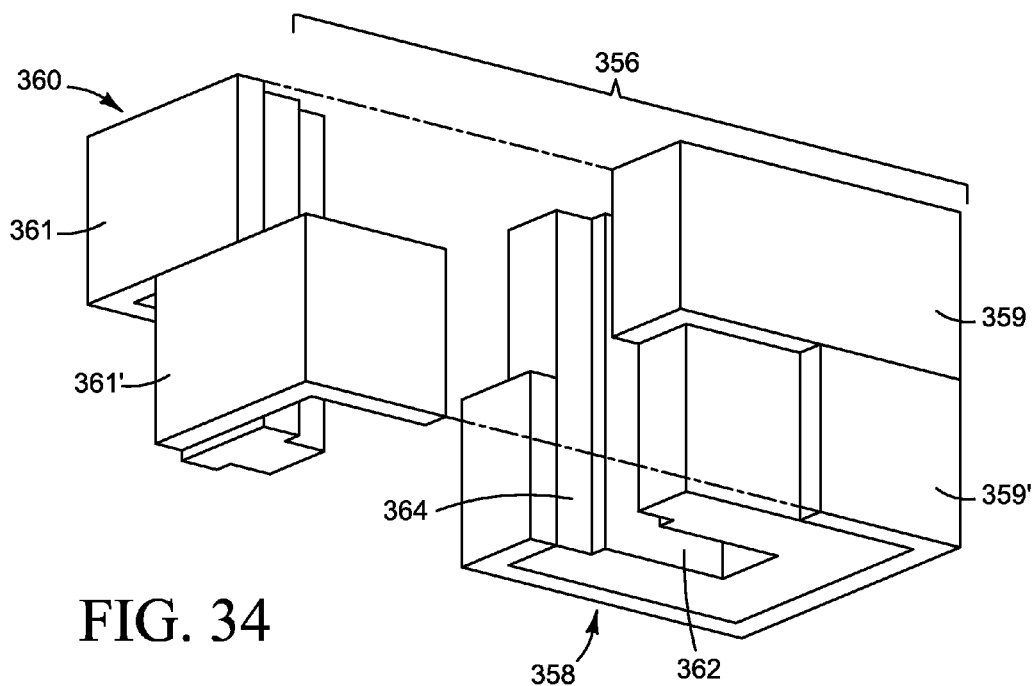
FIG. 34 is a bottom, exploded, perspective view of the column section of FIG. 31.

The second shell 360 comprises a generally T-shaped key piece 366 configured for receipt into the open side and into a generally T-shaped space defined in the core 357, thereby closing the open side. In the embodiment shown, the key piece 366 has connected there-to a pair of generally L-shaped corner pieces (361, 361') configured for interfitting with the upper and lower decorative elements (359, 359'), thereby creating the completed structure of the modular section (as shown in FIG. 30). Alternatively, the corner pieces could, rather than being L-shaped, could each instead comprise at least a pair of straight pieces that are adhered onto the core 357 thereby covering the opening, or other shapes.

The column can be capped, if so desired, through use of a cap piece 370. The cap 370 can be a single piece (FIG. 30) or can be comprised or one or more cap portions (372, 374), as shown in FIG. 35. These two cap designs are preferred for this type of column. Other cap designs are possible. Likewise, other column configurations would not utilize a "cap," but may, instead, utilize some form of a decorative spacer or other feature.

It is preferred that the shells, modular sections, and cap be joined together using an adhesive (as shown in FIGS. 30-35) or fasteners (not shown). In example, during assembly, an installer could utilize a number of beads of adhesive 368 to fix the components together.

Installation (in one embodiment) could start by the installation of a starter section 42 at the base of the wall around the structure. The installer could then begin at one side, preferably the left, and installing the panels from left to right. The installer would be begin by installing a corner piece 160 on the corner of the wall by dropping the groove 164 of the corner piece onto the tongue 44 of the starter section 42 and driving fasteners through the top flange 163 below the rear rabbet 167 and into the wall structure. A flat panel 180 could then be installed to the right of the corner piece 160, with the side flange 168 of the corner piece 160 inserted into the groove 189 of the flat panel 180 and the groove 184 for the flat panel installed on the tongue 44 of the starter section 42. Fasteners would then be driven through the top flange 182 below the rear rabbet 187 and into the wall structure. A second flat panel 180 could then be installed to the left of the corner piece 160, with the side flange 188 of the flat panel 180 inserted into the groove 169 of the corner piece 160 and the groove 184 for the flat panel installed on the tongue 44 of the starter section 42. Fasteners would then be driven through the top flange 182 below the rear rabbet 187 and into the wall structure. Upon reaching an end (for instance, adjacent a doorway), an end panel 190 would be installed. The end panel 190 would be installed onto the starter section 42, by accepting the tongue 44 into the end panel's bottom groove 194. The tongue of the adjacent (laterally) panel would then be received into the groove 199 of the end panel, the end panel then being fixed to the wall surface by fasteners being driven through the top flange 192 below the rear rabbet 197 and into the wall structure. During installation, the panels could be cut to length (or otherwise, as needed to fit), for instance through use of a masonry saw or other cutting means.

A second (vertically) row of panels could then be installed upon the wall by inserting bottom groove (164, 184, 194) of additional corner, end and flat portions onto the top flanges (162, 183, 193) of the installed corner, end and flat portions, and connecting the panels together and to the wall as previously described. In such an installation, the upper panel's outside flange and decorative element covers the fastener's head used to attach the lower panel to the wall surface. As desired, a cap portion 170 could be installed upon the upper most top flanges, with the bottom groove 172 of the cap portion receiving therein the upper most top flanges (162, 183, 193). Preferably, the cap portion 170 is attached to the top of the structure through use of an adhesive.

While certain exemplary embodiments are shown in Figures and in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An insulative siding panel system for installation upon a surface of a building structure through use of at least one fastener, said panel system comprising:
a starter section, said starter section having a tongue portion and a wall flange, said wall flange attaching to said building structure through use of said at least one fastener, said tongue portion spaced apart from said wall flange, thereby defining a channel there-between;
a first horizontal row of panels, said first row of panels comprising:
a first panel having a panel body and a decorative element, said panel body having a top side, a bottom side, a first end, a second end, a face side, and a back side, said panel body having a top tongue extending from said top side and a side tongue extending from said second end side, with said top and side tongue's having a front and a back side, with said front side of said tongue being a straight side, and with said back side of said tongue having a curve, said panel body having a bottom groove with a shape complimentary to said tongue, with a straight side and a curved side, defined in said bottom side and a side groove with a shape complimentary to said tongue, with a straight side and a curved side, defined in said first end side, said bottom groove slid onto said starter section tongue portion, said panel body consisting of foam, said first panel having an upper fastener receiving portion adjacent said top tongue and a side fastener receiving portion adjacent said side tongue, wherein at least one fastener can be inserted through said first panel at least one of said fastener receiving portions and into said building surface thereby attaching said first panel to said surface with said back side adjacent said building structure surface,
said decorative element comprising synthetic stone, said decorative element fixed to said panel body face side via an adhesive; and
a second panel having a panel body and a decorative element,
said panel body having a top side, a bottom side, a first end, a second end, a face side, and a back side, said panel body having a top tongue extending from said top side and a side tongue extending from said second end side, with said top and side tongue's having a front and a back side, with said front side of said tongue being a straight side, and with said back side of said tongue having a curve, said panel body having a bottom groove with a shape complimentary to said tongue, with a straight side and a curved side, defined in said bottom side and a second panel side groove with a shape complimentary to said tongue, with a straight side and a curved side, defined in said first end side, said bottom groove slid onto said starter section tongue portion, said second panel side groove slid onto said first panel side tongue after said first panel is fastened to said building surface thereby covering said first panel fastener receiving portion, said panel body consisting of foam, said second panel having an upper fastener receiving portion adjacent said top tongue and a side fastener receiving portion adjacent said side tongue, wherein at least one fastener can be inserted through said second panel at least one of said fastener receiving portions and into said building surface thereby attaching said second panel to said surface with said back side adjacent said building structure surface,
said decorative element comprising synthetic stone, said decorative element fixed to said panel body face side via an adhesive.

2. The insulative siding panel system of claim 1, further comprising a second horizontal row of panels, said second row of panels comprising:
at least one third panel having a third panel body and a third panel decorative element,
said third panel body having a top side, a bottom side, a first end, a second end, a face side, and a back side, said third panel body having a third panel top tongue extending from said top side and a third panel side tongue extending from said second end side, with said top and side tongue's having a front and a back side, with said front side of said tongue being a straight side, and with said back side of said tongue having a curve, said third panel body having a third panel bottom groove with a shape complimentary to said tongue, with a straight side and a curved side, defined in said bottom side and a third panel side groove with a shape complimentary to said tongue, with a straight side and a curved side, defined in said first end side, said third panel bottom groove slid onto the top tongue of at least one of said first row panels after said first row panels are fastened to said building surface, thereby covering said first panel upper fastener receiving portion, said third panel body consisting of foam, said third panel having a fastener receiving portion adjacent at least one of said third panel tongues, wherein at least one fastener can be inserted through said third panel at said third panel fastener receiving portion and into said building surface thereby attaching said third panel to said surface with said third panel back side adjacent said building structure surface, and said third panel decorative element fixed to said panel body face side via an adhesive, said third panel decorative element comprising synthetic stone.

3. The insulative siding panel system of claim 1, further comprising a cap piece, said cap piece having an underside defining a groove with a shape complimentary to said top tongue, with a straight side and a curved side, therein, said groove receiving therein a top tongue of a panel thereby capping said panel.

4. The insulative siding panel system of claim 1, further comprising a second horizontal row of panels, said second row of panels comprising:

at least one third panel having a third panel body and a third panel decorative element, said third panel body having a top side, a bottom side, a first end, a second end, a face side, and a back side, said third panel body having a third panel top tongue extending from said top side and a third panel side tongue extending from said second end side, with said top and side tongue's having a front and a back side, with said front side of said tongue being a straight side, and with said back side of said tongue having a curve, said third panel body having a third panel bottom groove with a shape complimentary to said tongue, with a straight front side and a curved back side, defined in said bottom side and a third panel side groove with a shape complimentary to said tongue, with a straight front side and a curved back side, defined in said first end side, said third panel bottom groove slid onto the top tongue of at least one of said first row panels after said first row panels are fastened to said building surface, thereby covering said first panel upper fastener receiving portion, said third panel body consisting of foam, said third panel having a fastener receiving portion adjacent at least one of said third panel tongues, wherein at least one fastener can be inserted through said third panel at said third panel fastener receiving portion and into said building surface thereby attaching said third panel to said surface with said third panel back side adjacent said building structure surface, and said third panel decorative element fixed to said panel body face side via an adhesive, said third panel decorative element comprising synthetic stone; and a cap piece, said cap piece having an underside defining a groove therein, said groove receiving therein a top tongue of a panel thereby capping said panel.

5. An insulative siding panel system for installation upon a surface of a building structure through use of at least one fastener, said panel system comprising:

a starter section, said starter section having a tongue portion and a wall flange, said wall flange attaching to said building structure through use of said at least one fastener, said tongue portion spaced apart from said wall flange, thereby defining a channel there-between;

a first horizontal row of panels, said first row of panels comprising:

a first panel having a panel body and a decorative element, said panel body having a top side, a bottom side, a first end, a second end, a face side, and a back side, said panel body having a top tongue extending from said top side and a side tongue extending from said second end side, with said top and side tongue's having a front and a back side, with said front side of said tongue being a straight side, and with said back side of said tongue having a curve, said panel body having a bottom groove with a shape complimentary to said top tongue, with a straight side and a curved side, defined in said bottom side and a side groove with a shape complimentary to said tongue, with a straight side and a curved side, defined in said first end side, said bottom groove slid onto said starter section tongue portion, said panel body consisting of foam, said first panel having an upper fastener receiving portion adjacent said top tongue and a side fastener receiving portion adjacent said side tongue, wherein at least one fastener can be inserted through said first panel at least one of said fastener receiving portions and into said building surface thereby attaching said first panel to said surface with said back side adjacent said building structure surface, said decorative element comprising synthetic stone, said decorative element fixed to said panel body face side via an adhesive; and a second panel having a panel body and a decorative element, said panel body having a top side, a bottom side, a first end, a second end, a face side, and a back side, said panel body having a top tongue extending from said top side and a side tongue extending from said second end side, with said top and side tongue's having a front and a back side, with said front side of said tongue being a straight side, and with said back side of said tongue having a curve, said panel body having a bottom groove with a shape complimentary to said tongue, with a straight side and a curved side, defined in said bottom side and a second panel side groove with a shape complimentary to said tongue, with a straight side and a curved side, defined in said first end side, said bottom groove slid onto said starter section tongue portion, said second panel side groove slid onto said first panel side tongue after said first panel is fastened to said building surface thereby covering said first panel fastener receiving portion, said panel body consisting of foam, said second panel having an upper fastener receiving portion adjacent said top tongue and a side fastener receiving portion adjacent said side tongue, wherein at least one fastener can be inserted through said second panel at least one of said fastener receiving portions and into said building surface thereby attaching said second panel to said surface with said back side adjacent said building structure surface, said decorative element comprising synthetic stone, said decorative element fixed to said panel body face side via an adhesive;

a second horizontal row of panels, said second row of panels comprising:

at least one third panel having a third panel body and a third panel decorative element, said third panel body having a top side, a bottom side, a first end, a second end, a face side, and a back side, said third panel body having a third panel top tongue extending from said top side and a third panel side tongue extending from said second end side, with said top and side tongue's having a front and a back side, with said front side of said tongue being a straight side, and with said back side of said tongue having a curve, said third panel body having a third panel bottom groove with a shape complimentary to said tongue, with a straight side and a curved side, defined in said bottom side and a third panel side groove with a shape complimentary to said tongue, with a straight side and a curved side, defined in said first end side, said third panel bottom groove slid onto the top tongue of at least one of said first row panels after said first row panels are fastened to said building surface, thereby covering said first panel upper fastener receiving portion, said third panel body consisting of foam, said third panel having a fastener receiving portion adjacent at least one of said third panel tongues, wherein at least one fastener can be inserted through said third panel at said third panel fastener receiving portion and into said building surface thereby attaching said third panel to said surface with said third panel back side adjacent said building structure surface, and said third panel decorative element fixed to said panel body face side via an adhesive, said third panel decorative element comprising synthetic stone.

6. The insulative siding panel system of claim 5, further comprising a cap piece, said cap piece having an underside defining a groove therein, said groove with a shape complimentary to said top tongue, with a straight side and a curved side, said groove receiving therein a top tongue of a panel thereby capping said panel.

* * * * *